United States Patent
Kokemohr et al.

(10) Patent No.: US 7,268,916 B2
(45) Date of Patent: Sep. 11, 2007

(54) DIGITAL IMAGE SHARPENING SYSTEM

(75) Inventors: Nils Kokemohr, Hamburg (DE); Michael J. Slater, Santee, CA (US)

(73) Assignee: Nik Software, Inc., San Diego, CA (US)

( * ) Notice: Subject to any disclaimer, the term of this patent is extended or adjusted under 35 U.S.C. 154(b) by 1086 days.

(21) Appl. No.: 10/381,268

(22) PCT Filed: Sep. 20, 2001

(86) PCT No.: PCT/US01/42276

§ 371 (c)(1),
(2), (4) Date: Mar. 19, 2003

(87) PCT Pub. No.: WO02/25589

PCT Pub. Date: Mar. 28, 2002

(65) Prior Publication Data

US 2004/0036923 A1    Feb. 26, 2004

Related U.S. Application Data

(60) Provisional application No. 60/234,270, filed on Sep. 20, 2000, provisional application No. 60/259,017, filed on Dec. 29, 2000, provisional application No. 60/258,763, filed on Dec. 29, 2000.

(51) Int. Cl.
*H04N 1/387* (2006.01)
*H04N 1/409* (2006.01)

(52) U.S. Cl. .............. 358/1.9; 358/1.2; 358/3.24; 358/3.27

(58) Field of Classification Search ............... 358/1.9, 358/1.2, 3.24, 3.27, 532, 447; 382/254, 260, 382/263–264, 266, 269
See application file for complete search history.

(56) References Cited

U.S. PATENT DOCUMENTS

| 4,536,803 A | 8/1985 | Hennig ................. 382/260 |
| 4,794,531 A | 12/1988 | Morishita et al. ......... 382/132 |
| 5,221,971 A | 6/1993 | Allen et al. ............. 358/3.01 |
| 5,270,808 A | 12/1993 | Tanioka ................. 358/527 |
| 5,473,440 A | 12/1995 | Haneda et al. ........... 358/300 |
| 5,486,927 A | 1/1996 | Koizumi et al. .......... 358/3.07 |
| 5,493,411 A | 2/1996 | Haneda et al. ........... 358/3.21 |

(Continued)

OTHER PUBLICATIONS

*Real World Photoshop 3*, David Blatner, Bruce Fraser, 1996, Table of Contents and Chapter 8.

*Primary Examiner*—Scott A. Rogers
(74) *Attorney, Agent, or Firm*—Robert J. Rose; Sheldon Mak Rose & Anderson PC

(57) ABSTRACT

A system and method for sharpening a digital image (38) having one or more image parameters, for printing with one or more print parameters, and for viewing at one or more viewing parameters, the method comprising the steps of preparing sharpening radius information correlated in a correlation process with one or more print parameters, creating a first data storage device (192) for storing the sharpening radius information, receiving the one or more print parameters, determining an image sharpening radius for the digital image (38) from the sharpening radius information and the received one or more print parameters, and sharpening the digital image (38) using the image sharpening radius in a sharpening algorithm. A correlation process is described, a sharpening algorithm with foliage protection, hue protection, antialiasing protection, and noise reduction is disclosed, and a detail identification process is described.

21 Claims, 10 Drawing Sheets

U.S. PATENT DOCUMENTS

| | | | |
|---|---|---|---|
| 5,563,713 A | 10/1996 | Sugiura | 382/256 |
| 5,602,943 A | 2/1997 | Velho et al. | 382/266 |
| 5,724,455 A | 3/1998 | Eschbach | 382/260 |
| 5,768,482 A | 6/1998 | Winter et al. | 358/1.9 |
| 5,774,599 A | 6/1998 | Muka et al. | 382/254 |
| 5,822,469 A | 10/1998 | Silverstein | 382/267 |
| 5,835,637 A | 11/1998 | Houchin et al. | 382/254 |
| 5,867,606 A | 2/1999 | Tretter | 382/261 |
| 5,907,640 A | 5/1999 | Delean | 382/276 |
| 5,982,926 A | 11/1999 | Kuo et al. | 382/167 |
| 6,005,984 A | 12/1999 | Kawakami et al. | 382/276 |
| 6,055,340 A | 4/2000 | Nagao | 382/261 |
| 6,058,248 A | 5/2000 | Atkins et al. | 358/1.2 |
| 6,075,926 A | 6/2000 | Atkins et al. | 358/1.2 |
| 6,091,861 A | 7/2000 | Keyes et al. | 382/299 |
| 6,097,470 A | 8/2000 | Buhr et al. | 355/38 |
| 6,097,847 A | 8/2000 | Inoue | 382/266 |
| 6,101,273 A | 8/2000 | Matama | 382/169 |
| 6,122,076 A | 9/2000 | Shiota | 358/447 |
| 6,154,288 A | 11/2000 | Watanabe | 358/1.9 |
| 6,163,389 A | 12/2000 | Buhr et al. | 358/527 |
| 6,169,823 B1 | 1/2001 | Takeo et al. | 382/308 |
| 6,195,467 B1 | 2/2001 | Asimopoulos et al. | 382/261 |
| 6,233,069 B1 | 5/2001 | Buhr et al. | 358/519 |

DIGITAL IMAGE SHARPENING SYSTEM

CROSS-REFERENCE TO RELATED APPLICATIONS

This Application also claims priority from International Application Number PCT/US01/42276, titled "Digital Image Sharpening System," filed 20 Sep. 2001.

The present Application claims the benefit of U.S. Provisional Patent Application No. 60/234,270 titled "System And Method For Sharpening Images" filed Sep. 20, 2000, U.S. Provisional Patent Application No. 60/259,017 titled "System And Method For Determining Optimal Sharpening Radius", filed Dec. 29, 2000, and U.S. Provisional Patent Application No. 60/258,763 title "System And Method For Optimizing Sharpening Of Digital Images," filed Dec. 29, 2000, the contents of each of which are incorporated by reference in this disclosure in their entirety.

BACKGROUND

This invention relates to a system and methods for optimizing the sharpening of digital images. It is a well-known problem to sharpen an image after it has been taken in order to remedy blurriness, if the image is out of focus, or to simulate a better film resolution, i.e., to create an image that looks like it was taken on a medium format camera while it was in fact taken on a small format 35 mm camera.

The problem is that in order to really make an image sharper, you would have to add details which are missing due to insufficient optical resolution or due to the blurriness resulting from a poorly configured or out-of-focus lens. This is not possible for any computer.

Hence, the most popular method that is used to sharpen images, the unsharp mask filter, does not actually make an image sharper, as will be known to those skilled in the art with reference to this disclosure. The unsharp mask method simply makes the image look sharper by making the smallest parts appear more "contrasty" or appear with more apparent clarity. It does this by in effect detecting all edges in the image and making the dark side of that edge even darker, and the light side of that edge even lighter, so that along most edges in the image some dark or light halos are created, having a halo width. The unsharp mask filter locates pixels that differ from surrounding pixels by a specified sharpening threshold, and increases the pixels' contrast by a specified sharpening strength, which is most often expressed as a percentage. The sharpening radius of the region to which each pixel is compared may also be specified, and in practice this is a critical factor in the final appearance of the image, since it determines halo width.

Since the unsharp mask filter creates the optical illusion of sharpness (instead of adding details), in many cases it also does a good job when applied to images that in fact already have sufficient resolution.

The unsharp mask filter operates in the following way, as will be known to those skilled in the art with reference to this disclosure, which in the typical user case will be performed ad hoc through an image processing program offering an unsharp mask filter, such as the image processing program sold under the trademark PHOTOSHOP®.

The user applies the unsharp mask filter by communicating with the image processing program through a dialog box, typically by entering a desired sharpening radius, sharpening strength, and sharpening threshold, while watching a preview on the screen of how the image changes. By this ad hoc procedure, the image is sharpened only in relation to the image's on-screen characteristics, and not in relation to the image as it appears after the printing process. That means that, depending on the printer, it is very likely that the image will be printed over-sharpened or under-sharpened. More advanced users try to bring their experience with the printing process into this, but it is uniformly understood that the risk of over or under sharpening still remains. Furthermore, by entering these values manually, there is no way of gaining a consistent look, and all images will look different since they are being sharpened inconsistently. This is a drawback for the visual appearance of the print, especially if several images are printed on the same page.

It is also a well-known problem that when sharpening an image using the unsharp mask method, color changes occur to the target image. When applied to an image the unsharp mask filter does not provide a method for treating colors. In addition to that, there are more problems with unsharp mask, such as that there may occur aliasing, i.e., some pixel structures may become more apparent and lead to unwanted structures (Moirée). Also, if implementing the unsharp mask algorithm based on the CMYK, RGB or Lab image modes, you will have unnatural saturations at the halos. Briefly, sharpening in RGB leads to color-irritations, while sharpening in CMYK and Lab typically leads to under saturated, weak-looking halos, which influence the overall appearance of the image negatively. A third problem is that there is currently no way of reducing noise in a way that the image still looks natural—the currently existing algorithms of reducing noise always make the image look unnatural. Another problem is that there are some regions in images, especially foliage, which are easily over-sharpened, simply because they contain more structures and hence will lead to more halos than other regions.

Prior methods for calculating parameters for use in the unsharp mask filter have focused upon sharpening strength as the key parameter. U.S. Pat. No. 5,867,606 to Tretter for "Apparatus and Method for Determining the Appropriate Amount of Sharpening for an Image" discloses a sharpening parameter selection system that determines the sharpening strength parameter. U.S. Pat. No. 4,591,923 for "Method and Apparatus for Intensifying Sharpness of Picture Images" discloses a method for determining the degree of sharpness intensification. Such methods fail to recognize, however, that the most important parameter in utilization of the unsharp mask filter is actually the sharpening radius.

The unsharp mask method therefore has these key problems: the presence of three apparently independent variables, e.g., sharpening strength, sharpening threshold, and sharpening radius, the ad hoc method of visual trial and error previewing, the assumption that sharpening strength is the key parameter in application of the unsharp mask filter, the failure to recognize that for a given image there is a preferred sharpening radius which leads to optimal results, dependent to a first approximation upon printer type, printer resolution, image pixel dimensions, and image printing size, and to a second approximation upon viewing distance and image detail, a lack of hue protection techniques for correcting color changes occurring during application of the unsharp mask filter, the presence of aliasing and unnatural saturation in sharpened images, over-sharpening of detail area, and lack of noise reduction. What is needed is a system and methods for determining the preferred sharpening radius for the unsharp mask filter for a given image, using at a minimum parameters based upon printer type, printer resolution, image pixel dimensions, and image printing size, and preferably also upon viewing distance and image detail, and which provides a method for correcting color changes occurring during sharpening, while correcting for aliasing and unnatural saturation in sharpened images, prevent over-sharpening of detail area, and effectively reduce noise.

SUMMARY

The present invention meets this need by providing a system for sharpening a digital image having one or more than one image parameter, for printing with one or more than one print parameter, and for viewing at one or more than one viewing parameter, comprising a first data storage device for storing radius information correlating one or more than one sharpening radius with one or more than one print parameter, a receiving module to receive the one or more than one print parameter for printing the digital image, a determining module to determine an image sharpening radius for the digital image from the radius information and the received one or more than one print parameter, a sharpening module for implementing a sharpening algorithm to produce a sharpened digital image using the image sharpening radius; and a second data storage device for storing the sharpened digital image.

In a preferred embodiment, a system is provided for sharpening a digital image having one or more than one image parameter, for printing with one or more than one print parameter, and for viewing at one or more than one viewing parameter, comprising a first data storage device for storing sharpening radius information correlated in a correlation process with one or more than one print parameter a receiving module to receive the one or more than one print parameter for printing the digital image, a determining module to determine an image sharpening radius for the digital image from the sharpening radius information and the received one or more than one print parameter, a sharpening module for implementing a sharpening algorithm to produce a sharpened digital image using the image sharpening radius, and a second data storage device for storing the sharpened digital image.

A method is provided for sharpening a digital image having one or more than one image parameter, for printing with one or more than one print parameter, and for viewing at one or more than one viewing parameter, comprising the steps of preparing sharpening radius information correlated in a correlation process with one or more than one print parameter, creating a first data storage device for storing the sharpening radius information, receiving the one or more than one print parameter for printing the digital image, determining an image sharpening radius for the digital image from the sharpening radius information and the received one or more than one print parameter, sharpening the digital image using the image sharpening radius in a sharpening algorithm to produce a sharpened digital image, and storing the sharpened digital image in a second data storage device.

In a further embodiment, a method is provided for sharpening a digital image having one or more than one image parameter, for printing with one or more than one print parameter, and for viewing at one or more than one viewing parameter, comprising the steps of receiving the one or more than one print parameter for printing the digital image, interrogating a first data storage device storing sharpening radius information correlated in a correlation process with one or more than one print parameter, determining an image sharpening radius for the digital image from the sharpening radius information and the received one or more than one print parameter, sharpening the digital image using the image sharpening radius in a sharpening algorithm to produce a sharpened digital image; and storing the sharpened digital image in a second data storage device.

A computer readable medium is provided having contents for causing a computer-based information handling system to perform steps for sharpening a digital image having one or more than one image parameter, for printing with one or more than one print parameter, and for viewing at one or more than one viewing parameter, the steps comprising receiving the one or more than one print parameter for printing the digital image, interrogating a first data storage device storing sharpening radius information correlated in a correlation process with one or more than one print parameter, determining an image sharpening radius for the digital image from the radius information and the received one or more than one print parameter, sharpening the digital image using the image sharpening radius in a sharpening algorithm to produce a sharpened digital image, and storing the sharpened digital image in a second data storage device.

In a preferred embodiment, the sharpening radius information is further correlated with one or more than one image parameter, or one or more than one viewing parameter, or both.

In a further preferred embodiment, the correlation process comprises the steps of selecting an initial sharpening radius as a test radius, and repeating until an optimal print is found, the steps of sharpening a copy of the digital image using the test radius in a sharpening algorithm, printing a test print, altering the test radius, comparing all test prints, recording the test radius used to print the optimal print, and storing the test radius used to print the optimal print in the first data storage device.

In a still further preferred embodiment, the digital image comprising pixels with luminosity, the sharpening algorithm comprises the steps of blurring a copy of the digital image using the image sharpening radius to produce a blurred image, the blurred image comprising pixels with luminosity, calculating a luminosity difference between the luminosity of the pixels of the digital image and the luminosity of the pixels of the blurred image, adjusting the luminosity difference by applying one or more than one algorithm chosen from the group consisting of a hue protection algorithm, an antialiasing protection algorithm, a noise reduction algorithm, an over-sharpening protection algorithm, and combining the digital image with the luminosity difference to produce a sharpened image.

A method is described for sharpening a digital image, the digital image comprising pixels with luminosity, comprising the steps of blurring a copy of the digital image to produce a blurred image, the blurred image comprising pixels with luminosity, calculating a luminosity difference between the luminosity of the pixels of the digital image and the luminosity of the pixels of the blurred image, and combining the digital image with the luminosity difference to produce a sharpened image. In one preferred embodiment the combining step comprises an over-sharpening protection algorithm, and in a further preferred embodiment, the method further comprises the step of adjusting the luminosity difference by applying one or more than one algorithm chosen from the group consisting of a hue protection algorithm, an antialiasing protection algorithm, a noise reduction algorithm, and an over-sharpening protection algorithm.

A method is provided for determining a detail resolution of a digital image comprising pixels with luminosity, for use in a sharpening algorithm, comprising the steps of choosing a plurality of related pixel pairs in the digital image, calculating a pixel luminosity difference for each of the plurality of pixel pairs, determining the largest pixel luminosity difference, and setting the detail resolution for the digital image equal to the largest luminosity difference. In a preferred embodiment, the method further comprises the step of eliminating one or more than one of the largest pixel luminosity differences.

A correlation process is provided for correlating a sharpening radius with one or more than one image parameter, one or more than one print parameter, or one or more than one viewing parameter, for use in sharpening a digital image having one or more than one image parameter, for printing with one or more than one print parameter, and for viewing at one or more than one viewing parameter, comprising the steps of choosing the one or more than one image parameter, the one or more than one print parameter, or the one or more than one viewing parameter to be correlated, selecting an initial sharpening radius as a test radius, repeating until an optimal print is found, the steps of sharpening a copy of the digital image using the test radius in a sharpening algorithm, printing a test print, altering the test radius, comparing all test prints, recording the test radius used to print the optimal print, and setting the sharpening radius to the test radius used to print the optimal print.

FIGURES

These and other features, aspects, and advantages of the present invention will become better understood with reference to the following description, appended claims, and accompanying drawings, where:

DETAILED DESCRIPTION

Figure 1:
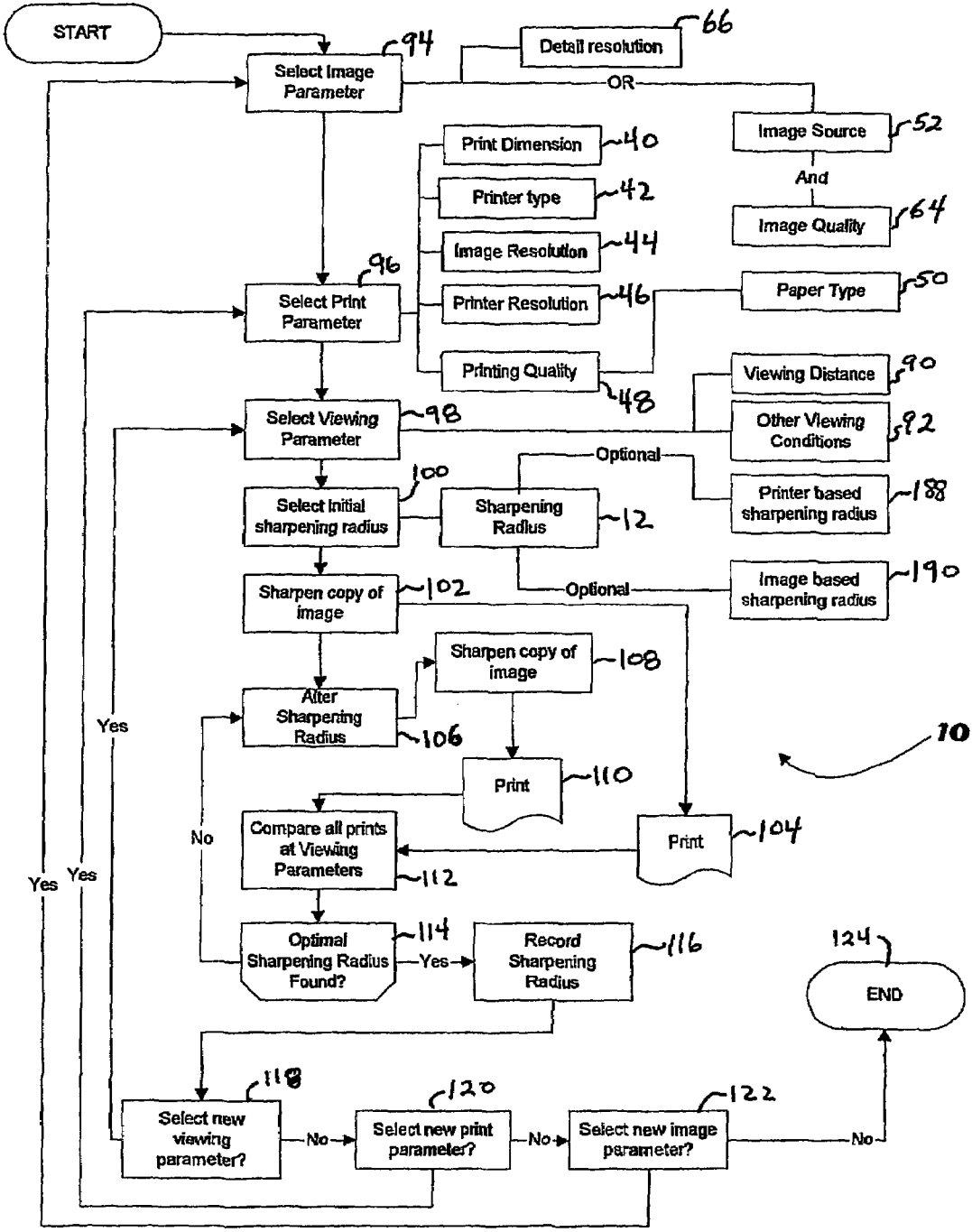
FIG. 1 is a flow diagram of a correlation process for correlating a sharpening radius with parameters to be used in the sharpening algorithm of FIG. 8, and the methods of FIG. 6 and FIG. 6A, in accord with the present invention.

The invention begins with reference to FIG. 1 through FIG. 6, by a correlation process 10 to determine a relationship between a sharpening radius 12 and one or more than one print parameter 14, image parameter 16, or optionally, viewing parameter 18, for use in a sharpening system 20 employing a sharpening method 36 comprising a sharpening algorithm 140, and optionally one or more algorithms for a hue protection method 158, an antialias protection method 160, a noise reduction method 162, and foliage protection method 152, for sharpening a digital image 38 for output on one or more than one Type 1 printer 24, Type 2 printer 26, Type 3 printer 28, or digital display device 30.

Print Parameters

Printer Type

There are myriad image printers available commercially, and a correlation process could theoretically proceed to test every available make and model of printer. Using the correlation process 10 of the invention as described herein, however, it is not necessary to test every possible printer; it is only necessary to create categories, and then test a sufficient number of samples within each category.

As will be evident to those skilled in the art with reference to this disclosure, broad categories of printers already exist in the art. For example, inkjet printers, color laser printers, photo printers, and standard offset printers are thought of as representing generally understood categories. It is possible to use the correlation process 10 of the present invention with any combination of these categories. Additionally, optionally an additional category for digital display devices could be added, treating the display of the image on a monitor as a final "print." This later category would be beneficial where output is to be displayed within a web page on the World Wide Web of the Internet, or other global or local area network.

Preferably, a grouping of these categories into one or more than one type could be made, in order to shorten the correlation process. Within a type, printers should generally produce similar output, all other parameters being held equal. Three types of printers have been found to possess such characteristics:

Type 1 Printers. Printers that raster the images and then print the image by using different dot sizes in the raster, comprise a first type of printer. These printers are most often offset printers. Offset print resolution is typically given in lines per inch (lpi).

Type 2 Printers. Printer types that "random dither" the pixels comprise a second type of printer. This means that, for instance, a region of 20% black is printed by printing only every fifth pixel, while leaving the other four blank. These printer types are typically printers that do have not enough resolution for raster printing such as Type 1 Printers, and that are only capable of either printing or not printing a pixel (i.e., they can't print a pixel with 30% opacity). Almost all printers that use this procedure are inkjet printers.

Type 3 Printers. Printers that are capable of printing a pixel of any or almost any desired color on the paper, also called half-toning, continuous-toning or full-toning, comprise a third type of printer. (Many different terms are used for these printers). Typical printers of this type are photo printers, thermal printers, LED printers, or color laser printers.

Figure 4:
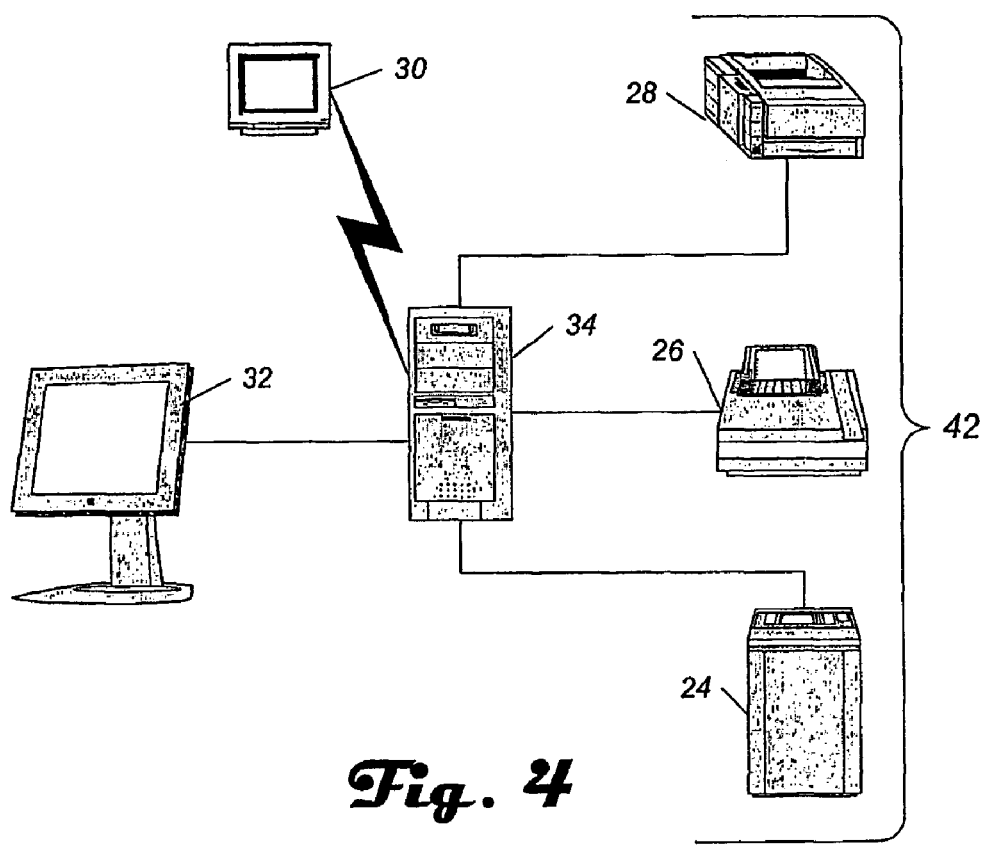
FIG. 4 is a system diagram of a system for sharpening digital images according to the present invention.
Figure 5:
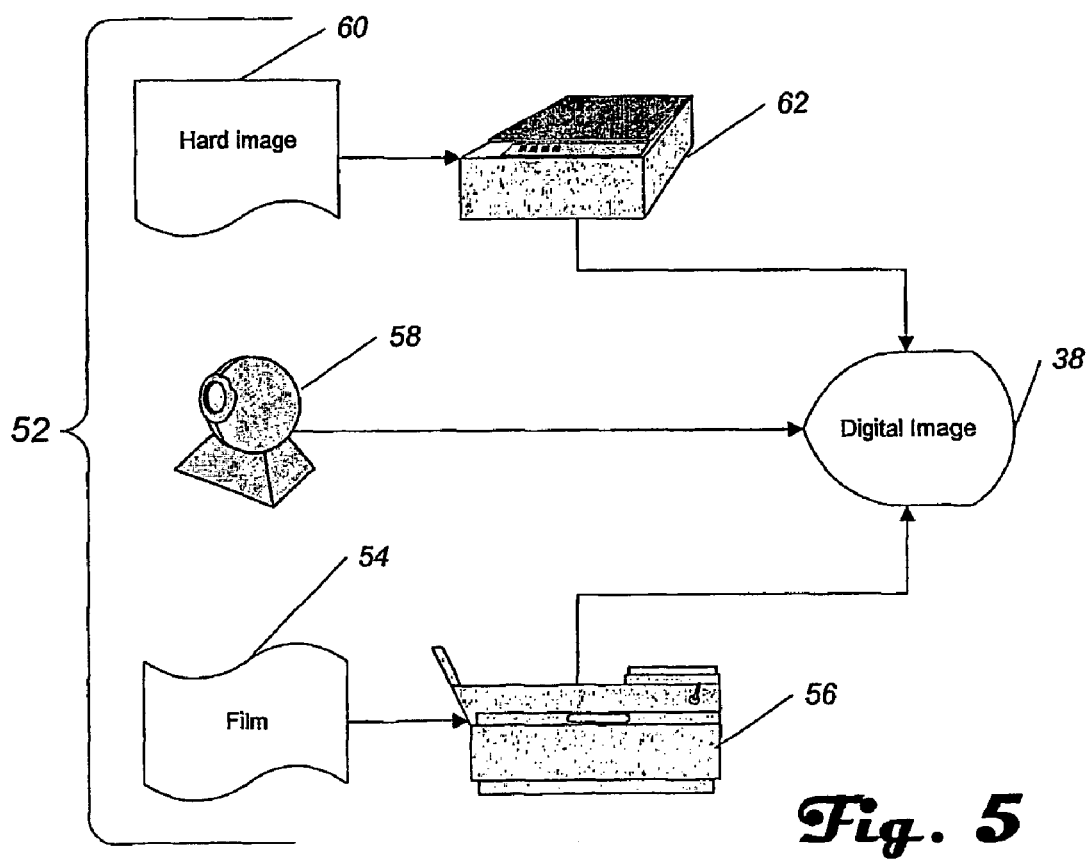
FIG. 5 is a pictorial diagram of the image sources useable for acquiring a digital image to be sharpened according to the present invention.
Figure 6:
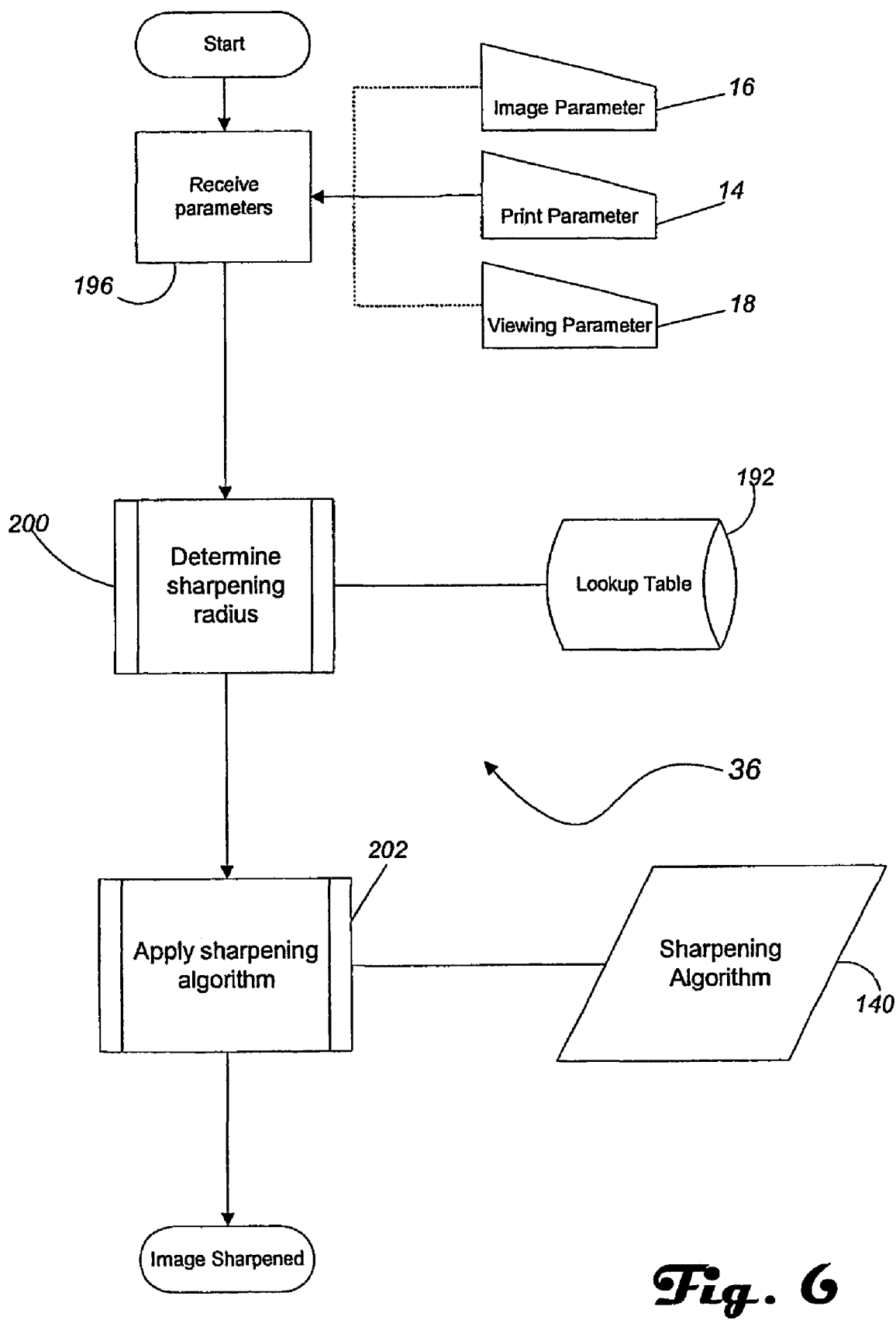
FIG. 6 is a flow diagram of a sharpening method for sharpening the digital image of FIG. 5 with a sharpening radius determined according to one or more embodiments of the process of FIG. 1.

With reference to FIG. 4, FIG. 5 and FIG. 6, a sharpening system 20 is shown comprising a computer monitor 32 and computer CPU 34 comprising a memory (not shown) and program instructions (not shown) for executing sharpening method 36 on a digital image 38, for output on one or more than one printer type 42, or a digital display device 30 through the Internet. As will be evident to those skilled in the art with reference to this disclosure, various combinations of printer type 42 or digital display device 30 will be possible using sharpening system 20.

Print Dimension

Each digital image 38 to be sharpened has associated with it a specific image size, expressed as a print dimension 40 in some measurement units, typically inches, centimeters, or millimeters. For example, common print dimensions in the United States are, in inches, 4×6, 6×6, 5×7, 8×10, 11×14, and 16×20. The invention treats print dimension 40 as a primary factor in sharpening; what is optimal sharpening for one size may not be optimal for another size.

Image Resolution/Pixel Dimension

Figure 7:
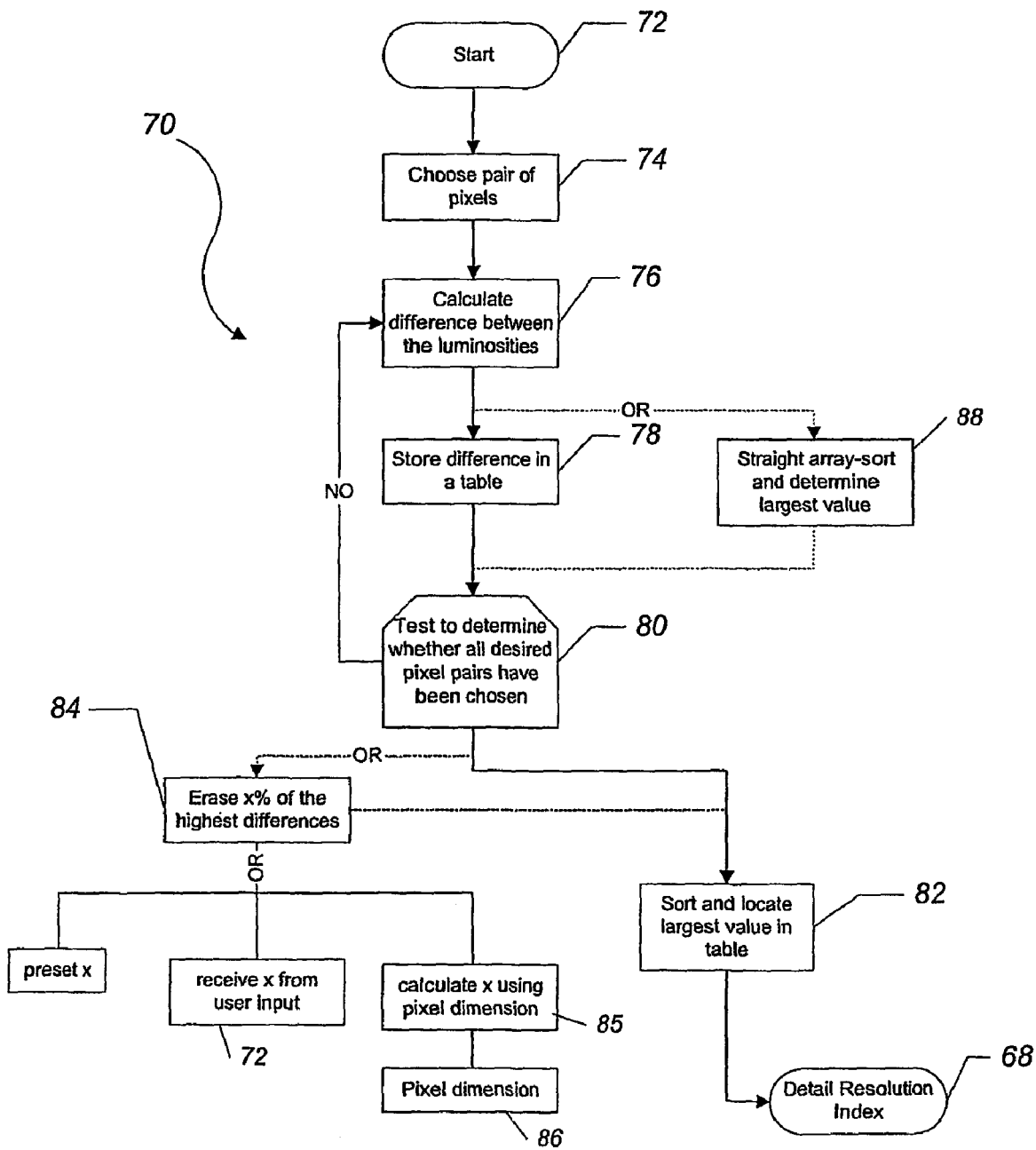
FIG. 7 is a flow diagram of a detail identification process to determine the detail resolution of the digital image of FIG. 5.

Further, each digital image 38 to be sharpened has associated with it an inherent pixel dimension 86, with reference to FIG. 7, which matches the print dimension 40 in aspect ratio. Dividing image pixel dimension 86 by print dimension yields the image resolution 44, typically expressed in dpi. For example, a digital image 38 with 6×6 inch print dimension 40 and 1800×1800 pixel dimension 86 has 300 dpi image resolution 44.

Printer Resolution

Printers have one or more than one inherent printer resolution 46. At a minimum, a standard or common printer resolution 46 should be used across each printer type 42 when using correlation process 10. Preferably, this standard printer resolution 46 should be one commonly used in current practice, and may be expected to increase with advances in technology. Preferably, a plurality of printer resolution 46 will be used in correlation process 10.

For a Type 1 printer 24, a standard or common line per inch (or lines per centimeter for outside the U.S.) setting should be correlated with correlation process 10 beginning with the current industry standard, which is currently 150 lpi. Optionally, other values ranging up to 350 lpi or more may be tested during correlation process 10. For a Type 2 printer 26, printer resolution 46 is typically expressed in a dpi number, and correlation process 10 may begin with a current industry standard, e.g., a 600×600 dpi printer. Each printer may be capable of multiple dpi resolutions, e.g., 300×300, 360×360, 720×360, 600×600, 720×720, 1440×720, 1200×1200, 1200×600, 1440×1440, or 2880×1440, and these may be included in correlation process 10 for increasing accuracy in the final sharpening. For a Type 3 printer 28, printer resolution 46 is also typically expressed in a dpi number, and correlation process 10 may begin with a current industry standard, e.g., a 600 dpi printer. Each printer may be capable of multiple dpi resolutions, e.g., 200, 300, 400, 600, 800, 1000, or 1200, and these may be included in correlation process 10 for increasing accuracy in the final sharpening. For a digital display device 30, printer resolution 46 is also typically expressed in a dpi number, and correlation process 10 may begin with a current industry standard, e.g., a 72 dpi monitor.

Printing Quality

For each printer type 42 and for each printer resolution 46 a further variation may exist in the printing quality 48 of output. This will generally be dependent upon the paper type 50 used, the age and quality of the printer, and the mode chosen for output. For example, a Type 2 printer 26 may have a draft mode, or a high-speed mode, or printing may be desired on a high quality glossy paper. Additionally, older printers may not produce as high quality print. Overall, these factors combine to produce a parameter that may be referred to as printing quality 48. This parameter is more important for a Type 2 printer 26 than for a Type 1 printer 24 or a Type 3 printer 28, because it makes a huge difference in the final print when printing at 720×720 dpi printer resolution 46 on plain paper type 50 as opposed to a coated glossy photo paper. For a Type 1 printer 24 or a Type 3 printer 28, correlation process 10 should start with the industry standard paper currently in use.

For a Type 2 printer 26, a 720 dpi paper of good quality should be chosen as the initial paper type 50.

It is theoretically possible to test every combination of paper type 50, mode, and printer type 42, but that may be of diminishing return. In a preferred embodiment, five categories of printing quality 48 are selected for correlation process 10, descriptively termed "bad," below average," "average," "above average," and "very good." Other descriptions could be used as will be evident to those skilled in the art with reference to this disclosure.

It is then sufficient to use correlation process 10 with a sampling within each category. In one embodiment of correlation process 10 for a Type 2 printer of "average" print quality, a 720 dpi paper of good quality is chosen as the initial paper type 50, and the quality setting on the printer driver (allowing a choice between "quality" and "speed") is set to "speed." For "above average" printing quality 48 a lighter weight paper designated for photos may be used, such as Tetenal brand SpectraJet® Duo Print Paper, with quality setting on the printer driver set to "speed." For "very good" print quality a heavy weight paper designated for photos may be used, such as Tetenal brand SpectraJet® High Glossy Paper Special, with quality setting on the printer driver set to "quality." For "below average" print quality a generic inkjet designated paper not specifically designated for photos may be used, with quality setting on the printer driver set to "speed," or "draft" if available. For "bad" print quality a generic photocopy machine paper not specifically designated for inkjet printers can be used, or even recycled paper, with quality setting on the printer driver set to "speed," or "draft" if available. As will be evident to those skilled in the art with reference to this disclosure, other variations are possible.

Additionally, optionally it is possible to deduce the printing quality 48 from the selected paper type 50, e.g., it is likely that a very good printing quality 48 is obtainable if premium high glossy photo paper has been selected, and that below average printing quality 48 is expected if plain paper is selected.

Image Parameters

Image Source

Even for equivalent pixel resolution images, the image source 52 of the digital image 38 will affect the optimal sharpening radius 12. Preferably, images scanned from APS format film 54 will need a higher sharpening radius 12 than the equivalent pixel dimension 86 digital image 38 scanned from a larger format negative film 54. As with other parameters, it is theoretically possible to test every conceivable camera, scanner, and film format. Testing a limited number of input sources, however, will reduce the complexity of correlation process 10. With reference to FIG. 5, it is possible to group image source 52 into three major category types: a film 54 scanned through a film scanner 56, a digital camera 58, and a hard image 60 scanned through an image scanner 62, and within those types, further species exists, e.g., APS, 35 mm transparency, medium format transparency, and large format transparency within film 54 type; digital camera (less than 1 million pixels, e.g., low-end), digital camera (between 1 and 2 million pixels, e.g., mid-range), and digital camera (between 2 and 4 million pixels, e.g., high-end) within digital camera 58 types; and image scanner (low-end), image scanner (mid-range), and image scanner (high-end) within image scanner 62 type.

Within each of the types, it is preferable to start with a midrange quality as the initial test input for correlation process 10, e.g., 35 mm transparency, digital camera (med-range) and image scanner (mid-range).

Image Quality

With reference to FIG. 1, in addition to consideration of the image source 52 in correlation process 10, image quality 64 may be considered for further refinement of the process. Image quality 64 may be qualitatively categorized into "bad," below average," "average," "above average," and "very good." Other descriptions could be used as will be evident to those skilled in the art with reference to this disclosure. This is necessarily a qualitative factor, but provides a way for including in correlation process 10 the age, deterioration, or damage condition of the hard image 60, or the quality of digital camera 58, image scanner 62, film scanner 56, or film 54.

Detail Resolution Index

Image source 52 and image quality 64 are directed to identifying the existing detail, and quality of the representation of that detail, within the digital image 38, which may be represented by a factor referred to as detail resolution 66. A very good image source 52 and a very good image quality would be expected to yield a high detail resolution 66, all other parameters being equal. With reference to FIG. 7, it would be preferable to quantify the detail resolution 66 of a particular digital image 38 by a detail resolution index 68, thereby making qualitative user input of the image source 52 and image quality 64 unnecessary, through a detail identification process 70.

One preferred embodiment of a detail identification process 70 to quantify the determination of the detail resolution 66 within a particular digital image 38 is determination of a detail resolution index 68 that is proportional to the number of details that a digital image 38, at its current image resolution 44, can display on a given vertical width, for example, 100 pixels. That means that the more blurry the image is, the lower will be the detail resolution index 68. A preferred algorithm for determining such a detail resolution index 68 would be linear, which means that if an image A is two times more out of focus than image B, image B would have twice the detail resolution index 68 of A.

A detail resolution index 68 should be uniform across the image's dimensions; if you cut out a section of 100×100 pixels out of a 2000×3000 pixel image, the section should typically have the same detail resolution index 68 as the image as a whole. Or to put it differently, multiplying a detail resolution index 68 by the amount of pixels of an image should lead to a number that is proportional to the number of details that the image could totally contain.

One preferred embodiment of detail identification process 70 for calculating detail resolution index 68 follows on the assumption that detail is related to luminosity difference between pixels, and with reference to FIG. 7, comprises the following steps:

(1) Choosing 74 a pair of related pixels;

(2) Calculating 76 the mathematical difference between the luminosities of that pair, (3) Storing 78 the difference in a table (an "array" or "list"), (4) Testing 80 to determine whether all desired pixel pairs have been chosen 80, and if not repeating calculation step 76;

(5) Sorting 82 the table of luminosity differences and locating the highest value, which value may be used as the detail resolution index 68 for that digital image 38.

Pixels are related when they are in the same relative neighborhood of the image, and the distance between the pixels is relatively small in comparison to the print dimension 40. A relatively small distance in the horizontal direction will lie between 0 (i.e., adjacent pixels) and about 1% of the print width, and in the vertical direction will lie between 0 and about 1% of the print height.

One method to calculate the luminosity 1 of a pixel is to average the red, green and blue luminosities of that pixel according to the formula:

$$1=(r+g+b)/3 \qquad \text{(Eq. 1)}$$

where r, g, and b are the respective red, green and blue luminosities. This can be repeated for both pixels in the pair, and the difference calculated.

Other embodiments of detail identification process 70 are possible. Sometimes there is a scratch or something else in the digital image 38 to be sharpened which is very contrasty, but doesn't belong to the real image data. The presence of that artifact will yield a very high detail resolution index 68 using the first described embodiment of detail identification process 70. A preferred embodiment to deal with this problem is to optionally add a step 84 erasing some preset percentage x of the highest differences. For instance, if x equals 20%, the top 20% of the values in the table would be eliminated. Values for x may range from about 0% to about 3%, preferably in the range from about 0.0005% to about 0.5%.

In a system 20 employing detail identification process 70 the number x might be made variable, by adding a step of inputting 72 the value x. For example, a user might note that the image contains many scratches, input this to the program running detail identification process 70 on computer CPU 34, and then a higher value of x (resulting in more luminance differences being discarded) may be used. Alternatively, the user might note that the image is of high quality, with few scratches, and a correspondingly lower number of x, approaching 0, might be used.

In another embodiment, a step may be added of calculating 85 x to vary inversely with pixel dimension 86, being lowered as the pixel dimension 86 gets larger, since a 5000×5000 pixel image does typically not contain 100 times more details than a 500×500 pixel image.

In another embodiment, the step of storing 78 the difference in a table is replaced by the step of counting 88 all occurring values of differences and determining the largest value, in a technique called a straight array-sort. If this makes sense or not depends on the processor speed, the available memory and the bit-depth of the image.

Further variations in calculating detail resolution index 68 based upon luminosity differences are possible. In one embodiment, the pixels in the pair chosen in step 74 are adjacent. In a further embodiment, a stochastic sample surrounding each pixel is used.

In step 80, in one embodiment, testing determines whether all pixels have been examined. In another embodiment, smaller regions are used in the calculation. In a further embodiment, regions are ignored. In one preferred embodiment, a running statistical test is used in step 80, and the loop is terminated when a significant number of calculations lie within a standard deviation of each other.

It will now be evident to those skilled in the art with reference to this disclosure that the various ways of creating a detail identification process 70, resulting in detail resolution index 68, have been described, and that the particular algorithm used may be chosen to fit the particular application.

Viewing Parameters

Viewing Distance

The distance between the viewer and the final print determines the nature and quality of the viewer's perception of the sharpened image. Adding a viewing distance 90 parameter to correlation process 10 allows better control of sharpening for images that are to be viewed differently, based on the perspective of the intended audience. In a preferred embodiment, because each person estimates the distance between the eye and an object differently, five general categories for distance are used, corresponding to: "Book," "Small Box," "Large Box," "Small Poster," and "Large Poster." In that embodiment, the Book setting represents the distance for a book or any object that would be held in the viewer's hands, such as catalogs, magazines, CD covers, etc. The Small Box setting is for objects with images and print for smaller objects, such as a breakfast cereal box or wine bottle, and objects that are meant to be viewed at "shelf sight" distance. The Large Box setting is used for cartons bigger than a bread box—television, VCR, computer, and so forth.

The Small Poster setting is intended for small signs and posters that would viewed at closer distances. The Large Poster setting on the other hand, is intended for objects viewed at further distances, usually larger posters, signs, or similar objects found outdoors.

In further embodiments other viewing conditions 92, perhaps intensity and color of lighting, may also be considered in correlation process 10.

Personal Taste

As described below, the determination of what is perceived as an appropriately sharpened image is determined by one or more than judges in step 112, who may have slightly different, but internally consistent styles. This may be taken into account in correlation process 10 by keeping the results segregated by judge, yielding a profile that may be chosen at the time of sharpening, by in effect, choosing a "judge" with a known bias, e.g., harder sharpening or softer sharpening.

Sharpening Algorithm

As will be known to those skilled in the art with reference to this disclosure, there are many algorithms for sharpening digital images. Any sharpening algorithm 140 may be used according to the processes and system of the invention which takes an input parameter, and any such input parameter to the sharpening algorithm 140 may be correlated according to correlation process 10 and implemented as described herein, making appropriate adjustment in correlation process 10. Preferably, a sharpening algorithm that utilizes one or more parameters that take a size setting into consideration which is used to determine the size of the details that the sharpening algorithm will accentuate will be used. In a preferred embodiment the unsharp mask filter is used, but those skilled in the art with reference to this disclosure will understand that correlation process 10 may be used with any high pass or sharpening filter to determine a correlation between input parameters and optimal application of a sharpening filter.

The sharpening algorithm 140 is implemented in two aspects of the invention. First, it is used in correlation process 10 to correlate one or more than one input parameter, preferably sharpening radius 12, with one or more than one print parameter 14, one or more than one image parameter 16, and one or more than one viewing parameter 18. Second, it is used within sharpening method 36 to actually sharpen digital images.

In one embodiment, use may be made of a commercially available image processing program to effect the sharpening algorithm 140, such as Photoshop®. Optionally, a sharpening algorithm 140 may be calculated directly upon the digital image 38, as will be evident to those skilled in the art with reference to this disclosure. Preferably, whichever sharpening algorithm 140 is used, it will be the same algorithm that will be incorporated into the final sharpening method 36. It is not necessary, however, if one of the supplemental corrections of hue protection 158, antialiasing protection 160, noise reduction 162, or foliage protection 152 is added to sharpening algorithm 140, to use those corrections in correlation process 10.

Figure 8:
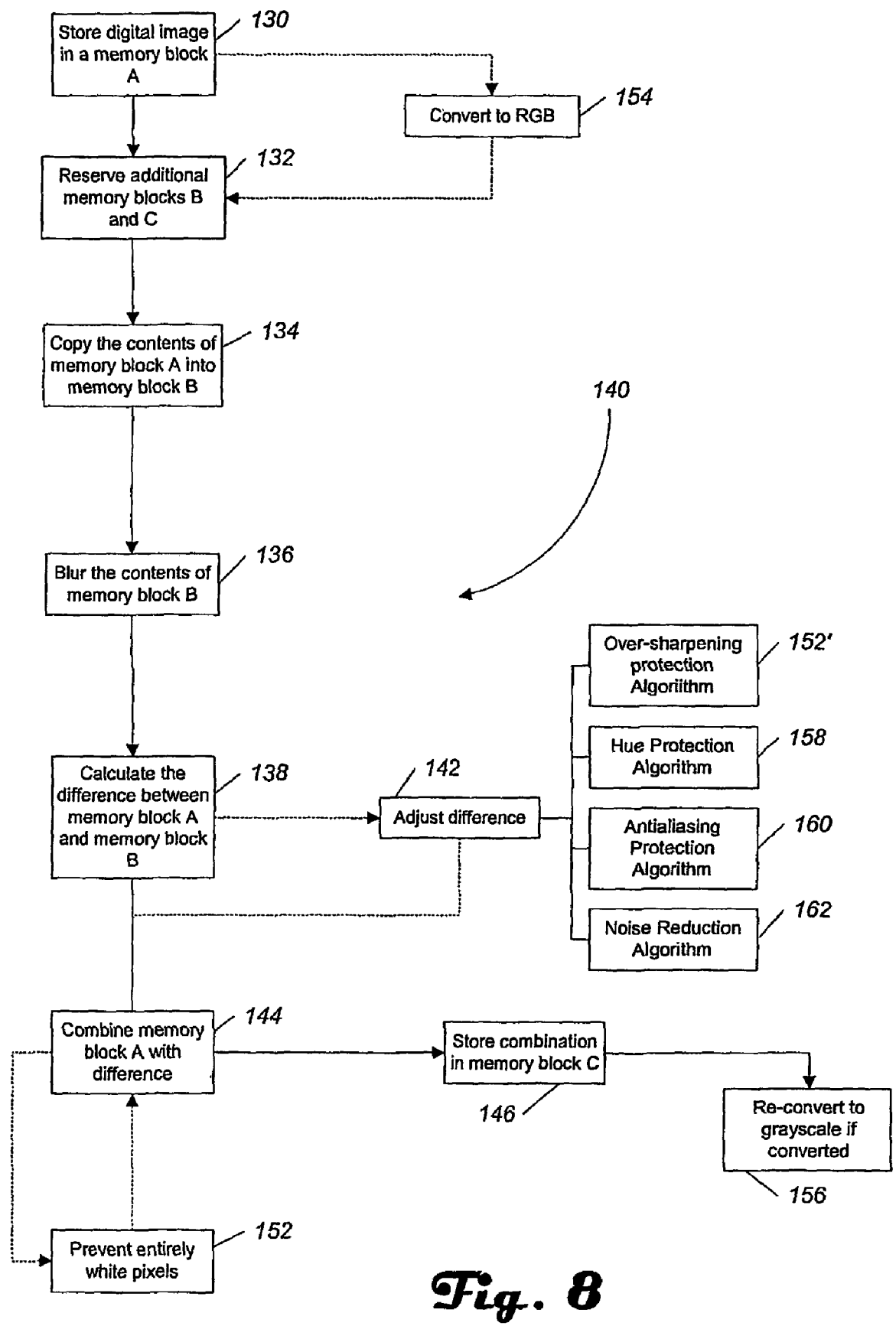
FIG. 8 is a flow diagram of a sharpening algorithm usable in the sharpening method of FIG. 6.

If no sharpening algorithm is preferred, the following algorithm may be used as the sharpening algorithm 140, with reference to FIG. 8, comprising the steps of:

(1) storing 130 digital image 38 as an RGB image in a memory block A (a two-dimensional array, dynamic two-dimensional list);

(2) reserving 132 two additional memory blocks of the same structure and size named memory block B and memory block C;

(3) copying 134 the contents of memory block A into memory block B;

(4) blurring 136 the contents of memory block B;

(5) for each pixel within memory block A, calculating 138 the luminosity difference between the current pixel in memory block A and the corresponding pixel in memory block B;

(6) optionally, adjusting 142 the luminosity differences by applying any desired combination of hue protection algorithm 158, antialiasing protection algorithm 160, noise reduction algorithm 162, or over-sharpening protection algorithm 152';

(7) combining 144 memory block A and the luminosity differences, and (8) storing 146 the combination in memory block C;

where memory block C will now contain the sharpened image.

The term memory block refers to any possible computer-related image storage structure known to those skilled in the art, including but not limited to RAM, Processor Cache, Hard Drive, or combinations of those, including dynamic memory structures.

The blurring step 136 is preferable done by folding the contents of memory block B with a low-frequency curve, with a standard deviation equal to the sharpening radius 12, expressed in pixels. The low frequency curve is preferably a Gaussian bell-shaped curve, which has a standard deviation equal to the sharpening radius 12. Making an image blurry is something where many algorithms exist, as will be known to those skilled in the art with reference to this disclosure. The Gaussian bell-shaped curve has some very nice characteristics that make it easy to accelerate, and it yields the most natural-looking sharpened images. Other algorithms using various low-frequency curves may be used, and preferably the standard deviation of the resulting curve should be set to the sharpening radius 12.

A suitable blur algorithm may be constructed as follows: take a white image with one black pixel in the middle and make it blurry with the proposed algorithm. After that, you'll have a black cloud in the middle of the image. The standard deviation of this black cloud may be set to the sharpening radius 12. Preferably, sharpening radius 12 will be expressed in millimeters, but as will be obvious to those skilled in the art with reference to this disclosure, any system of measurement units could be used if it is applied consistently. The reason for maintaining radius values in measurement units is to allow for variation of print dimension 40 independent of image resolution 44. The value for the sharpening radius may be easily converted into pixel units by dividing by the edge length of a pixel, which is determined by the image's pixel dimension 86 and print dimension 40. For example, if print dimension 40 is 5×7, pixel dimension 86 is 2100×1500, and sharpening radius 12 is 0.12 mm, then image resolution 44 is 300 dpi, and sharpening radius 12 is 1.4 pixels (0.12 mm*300 dpi/25.4 mm/inch).

The luminosity differences may be represented by the values $d_r$, $d_g$, and $d_b$, representing the mathematical difference between the luminosity of the current pixel in memory block A and in memory block B:

$$d_r = Axy_r - Bxy_r \text{ (x and y are the actual pixel coordinates)} \tag{Eq. 2}$$

$$d_g = Axy_g - Bxy_g \tag{Eq. 3}$$

$$d_b = AxY_b - Bxy_b \tag{Eq. 4}$$

where $Mxy_c$ is the luminosity of color channel c of the pixel with coordinate (x, y) in memory block M.

For the combination step 144, many different ways are possible to combine memory block A with the luminosity differences. In one embodiment, typified by the basic unsharp mask filter, Equation 5 through Equation 7 are used:

$$Cxy_r = Axy_r + d_r * p \tag{Eq. 5}$$

$$Cxy_g = Axy_g + d_g * p \tag{Eq. 6}$$

$$Cxy_b = Axy_b + d_b * p \tag{Eq. 7}$$

where sharpening strength p is a value preferably about 1.3, and $Cxy_c$ does not exceed the limits of the minimum and maximum luminosity, typically about 0 and about 255.

Foliage Protection

In a preferred embodiment of sharpening algorithm 140, combination step 144 uses an over-sharpening protection algorithm, what may be termed foliage protection, to prevent the over-sharpening of typical image structures such as foliage. The problem is that when you over-sharpen a tree, for instance, you will create many white pixels, which don't look good and which make the tree's foliage look very flat and non-three-dimensional. Of course, the term foliage protection represents not only foliage but also structures which are similar, such as hair, grass, etc. By following the methods of the present invention, and in particular by apply antialias protection according to the disclosure, the problem of foliage over sharpening should be automatically much less, but preferably sharpening algorithm 140 should be altered to prevent such over sharpening. In a preferred embodiment, sharpening algorithm 140 comprises a further foliage protection step preventing 152 sharpened pixels which are rather bright from becoming entirely white.

The foliage protection step can be implemented in many different ways. In one embodiment, it could be implemented as a further adjustment in adjusting step 142, or the equations used in combining step 144 could be altered. For instance, you could lower $d_r$, $d_g$ and $d_b$ the closer the luminance of the pixel in the original image is to the maximum possible luminance, typically 255, either as an adjustment in step 142, or within the equations of combination step 144.

Figure 9:
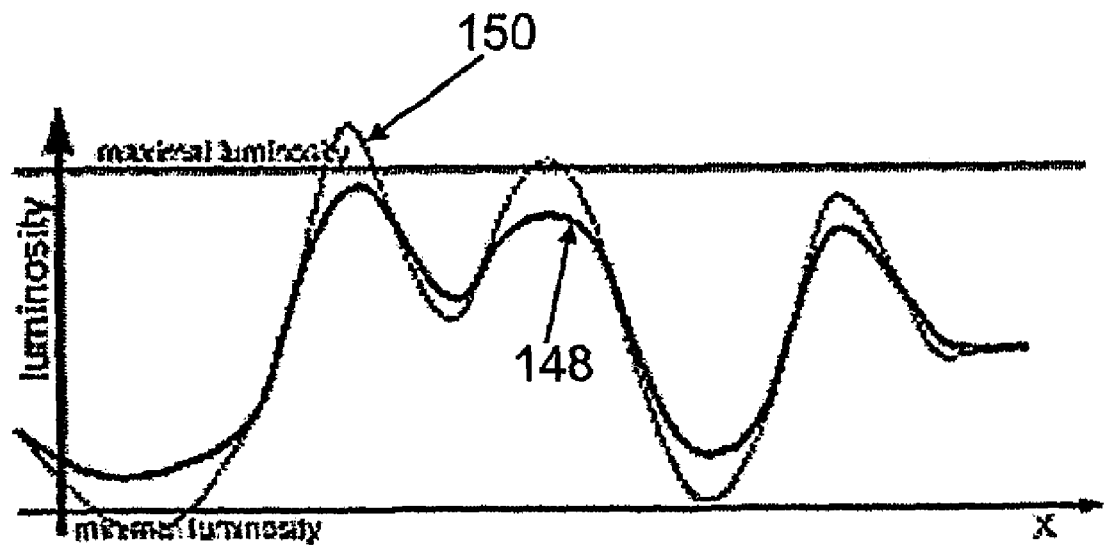
FIG. 9 is a graph showing before and after luminosity of a digital image sharpening without foliage protection.
Figure 10:
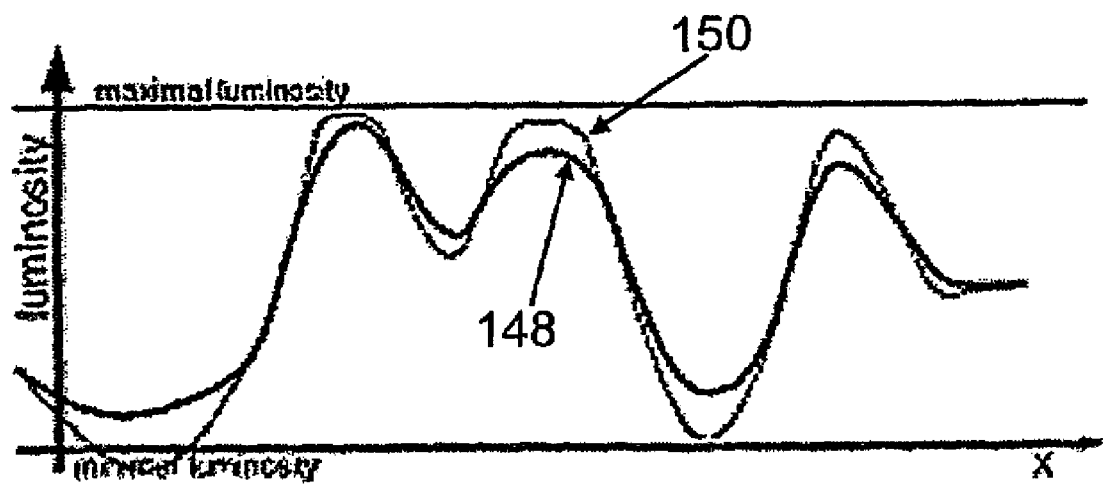
FIG. 10 is a graph showing before and after luminosity of a digital image sharpening with foliage protection according to the present invention.

FIG. 9 shows sharpening without the foliage protection step 152, and FIG. 10 shows sharpening with the foliage protection step 152. In both figures, the thick unsharpened curve 148 shows the original image, and the thin sharpened curve 150 shows the sharpened image.

As is evident from FIG. 10, an effective foliage protection step 152 in sharpening algorithm 140 works by reducing $d_r$, $d_g$, and $d_b$, the closer the original image is to the maximum luminosity, so that the sharpened image avoids exceeding the maximum luminosity.

As will be evident now to those skilled in the art with reference to this disclosure, there are many formulas to implement foliage protection in sharpening algorithm 140. One embodiment to achieve the foliage protection 152 is in combining step 144, to use Equation 8 through Equation 10 in place of Equation 5 through Equation 7, as follows:

$$Cxy_r = \min(Axy_r + d_r, (Axy_r + 255 * f)/(1+f)) \tag{Eq. 8}$$

$$Cxy_g = \min(Axy_g + d_g, (Axy_g + 255 * f)/(1+f)) \tag{Eq. 9}$$

$$Cxy_b = \min(Axy_b + d_b, (Axy_b + 255 * f)/(1+f)) \tag{Eq. 10}$$

where min(a,b) is defined as the lowest value of a and b, and the scaling factor f is less than or equal to 1. As will be known to those skilled in the art with reference to this disclosure, variations on Equation 8 through Equation 10 are possible without departing from the invention. In one further embodiment, sharpening strength p may be included as a further scaling factor.

One further embodiment to achieve the foliage protection 152' is to change the values $d_r$, $d_g$ and $d_b$ by the following equation in the adjusting step 142:

$$d_r \leftarrow d_r/((256/(256-Axy_r))^{\wedge}(1/n)) \tag{Eq. 11}$$

$$d_g \leftarrow d_g/((256/(256-Axy_g))^{\wedge}(1/n)) \tag{Eq. 12}$$

$$d_b \leftarrow d_b/((256/(256-Axy_b))^{\wedge}(1/n)) \tag{Eq. 13}$$

before Equations 5, 6 and 7 are applied. In other words: divide the values d by the $n^{th}$ root of maximum luminosity divided by the difference of the pixels luminosity and the maximum luminosity, in this instance assumed to be 255. (Use of 256 was made to avoid division by zero). The value of n can be any number between 1.5 and 5, preferably between about 2 and 3.3.

In a still further embodiment the above equations according to the foliage protection are used only if the actual pixel is going to be lightened by the sharpening process. For instance, you may wish to apply the Equations 8, 9 and 10 only if the condition $(d_r + d_g + d_b) > 0$ is TRUE. It is also possible to apply the individual Equation 8 only if the condition $d_r>0$ is TRUE, Equation 9 only if $d_g>0$ is TRUE and Equation 10 only if $d_b>0$ is TRUE. Those skilled in the art will know that many processes to restrict the foliage protection to those pixels that are going to be lightened are easy to create.

The foliage protection step 152 to sharpening algorithm 140 need only be applied asymmetrically, e.g., to the bright colors and not to the dark colors.

Grayscale Images

Sharpening algorithm 140 may be used with grayscale images, and in an embodiment where the formulas used assume the presence of an RGB image, it will be necessary to add steps to sharpening algorithm 140 converting 154 the image into a RGB image, and then reconverting 156 after sharpening. Since the conversion from grayscale to RGB and backwards is extremely simple and extremely fast this leads to an efficient algorithm that sharpens grayscale images.

In a further embodiment where speed is critical, sharpening algorithm 140 may be performed directly on the grayscale image, that means on a single-channel image. In that embodiment, instead of calculating $d_r$, $d_g$ and $d_b$, it is sufficient to calculate the difference in luminosity values $d_h$ on a single channel. Hue protection is not needed. Antialiasing protection needs to be applied to a grayscale image the very same way as to one RGB channel.

CMYK Images

Applying sharpening algorithm 140 to CMYK images may be done, as with grayscale images, by converting 154 the CMYK image into RGB, and then to re-convert 156 it back, but unlike with grayscale images this is not trivial and may lead to some unwanted effects.

In a preferred embodiment for CMYK images, instead of using the steps of conversion 154 and re-conversion 156, and instead of calculating luminosity differences for the red, green and blue channels, i.e., $d_r$, $d_g$, and $d_b$, it is necessary to calculate for the cyan, magenta, yellow and black channels, i.e., $d_c$, $d_m$, $d_y$, and $d_k$, and Equation 5 through Equation 7 becomes:

$$Cxy_c = Axy_c + d_c * p \qquad (Eq.\ 14)$$

$$Cxy_m = Axy_m + d_m * p \qquad (Eq.\ 15)$$

$$Cxy_y = Axy_y + d_y * p \qquad (Eq.\ 16)$$

$$Cxy_k = Axy_k + d_k * p \qquad (Eq.\ 17)$$

Foliage protection may be used with CMYK images, as with RGB images, and corresponding changes to account for four channels should be made throughout the sharpening algorithm 140.

Hue Protection Algorithm

In a preferred embodiment, an adjustment step 142 is added to sharpening algorithm 140 comprising one or more than one further algorithms, which form a group of luminosity difference adjusting algorithms. In one embodiment, adjustment step 142 comprises a hue protection algorithm 158 to protect the color of the sharpened image, by adjusting the luminosity difference in each color channel dependent upon the luminosity differences in the other channels.

In a preferred embodiment of a hue protection algorithm 158, for each luminosity difference, applying the following algorithm to the difference values $d_r$, $d_g$ and $d_b$ produces better colors:

$$d_r' = d_r * h + (d_r + d_g + d_b)/3 * (1-h) \qquad (Eq.\ 18)$$

$$d_g' = d_g * h + (d_r + d_g + d_b)/3 * (1-h) \qquad (Eq.\ 19)$$

$$d_b' = d_b * h + (d_r + d_g + d_b)/3 * (1-h) \qquad (Eq.\ 20)$$

where h is a value between 0 and 1 and preferably between about 0.3 and about 0.6. For example, when h is 0.5 the formulas yield:

$$d_r' = d_r * 2/3 + d_g/6 + d_b/6 \qquad (Eq.\ 21)$$

$$d_g' = d_r/6 + d_g * 2/3 + d_b/6 \qquad (Eq.\ 22)$$

$$d_b' = d_r/6 + d_g/6 + d_b * 2/3 \qquad (Eq.\ 23)$$

and after that: $d_r = d_r'$, $d_g = d_g'$, and $d_b = d_b'$.

For CMYK images, the following formulas could be used:

$$d_c' = d_c * h + (d_c + d_m + d_y)/3 * (1-h) \qquad (Eq.\ 24)$$

$$d_m' = d_m * h + (d_c + d_m + d_y)/3 * (1-h) \qquad (Eq.\ 25)$$

$$d_y' = d_y * h + (d_c + d_m + d_y)/3 * (1-h) \qquad (Eq.\ 26)$$

while $d_k$ remains unaffected. Unlike in RGB, h now needs to be slightly higher (about 0.15) to gain the same effects as in RGB. In a further embodiment, where a lot of black is printed h may be increased very slightly the darker the pixel's luminosity is, in order to create more natural colors. Any hue protection algorithm that adjusts the luminosity difference in one color channel dependent upon the luminosity differences in other channels will work, and be within the scope of the invention.

Antialiasing Protection Algorithm

Figure 12:
FIG. 12 is a magnified view of the edge of FIG. 11 sharpened without antialiasing protection.
Figure 11:
FIG. 11 is a magnified view of an edge within the digital image of FIG. 5.

It may occur during sharpening that an antialiased but very hard (i.e., contrasty) edge, as shown in FIG. 11, is sharpened, that a very obvious pixel structure occurs, in other words, the antialiasing gets lost, as shown in FIG. 12.

Figure 13:
FIG. 13 is a magnified view of the edge of FIG. 11 sharpened with antialiasing protection according to the present invention.

While it is not possible to entirely avoid that, you can at least reduce this unwanted effect by limiting the maximal sharpening amount to a fixed value. This will affect the sharpening only where some really extreme edges occur, which are the areas which are in danger of being oversharpened. In one preferred embodiment, adjustment step 142 comprises an antialiasing protection algorithm 160 to prevent the oversharpening of extreme edges. In one preferred embodiment of an antialiasing protection algorithm 160, the following adjustments are made to the luminosity differences:

$$\text{If } d_r < -a \text{ then } d_r = -a \qquad (Eq.\ 27)$$

$$\text{if } d_r > a \text{ then } d_r = a \qquad (Eq.\ 28)$$

$$\text{if } d_g < -a \text{ then } d_g = -a \qquad (Eq.\ 29)$$

$$\text{if } d_g > a \text{ then } d_g = a \qquad (Eq.\ 30)$$

$$\text{if } d_b < -a \text{ then } d_b = -a \qquad (Eq.\ 31)$$

$$\text{if } d_b > a \text{ then } d_b = a \qquad (Eq.\ 32)$$

where α is a value which is between 0 and 255, typically between about 50 and about 150. When this algorithm is applied, as result as shown in FIG. 13 is achieved.

For CMYK images, the following formulas may be used:

$$\text{if } d_c < -a \text{ then } d_c = -a \qquad (Eq.\ 33)$$

$$\text{if } d_c > a \text{ then } d_c = a \qquad (Eq.\ 34)$$

$$\text{if } d_m < -a \text{ then } d_m = -a \qquad (Eq.\ 35)$$

$$\text{if } d_m > a \text{ then } d_m = a \qquad (Eq.\ 36)$$

$$\text{if } d_y < -a \text{ then } d_y = -a \qquad (Eq.\ 37)$$

if $d_y > a$ then $d_y = a$ (Eq. 38)

if $d_k < -a$ then $d_k = -a$ (Eq. 39)

if $d_k > a$ then $d_k = a$ (Eq. 40)

where α is a value which is between 0 and 255, typically between about 50 and about 150.

Noise Reduction

Figure 14:
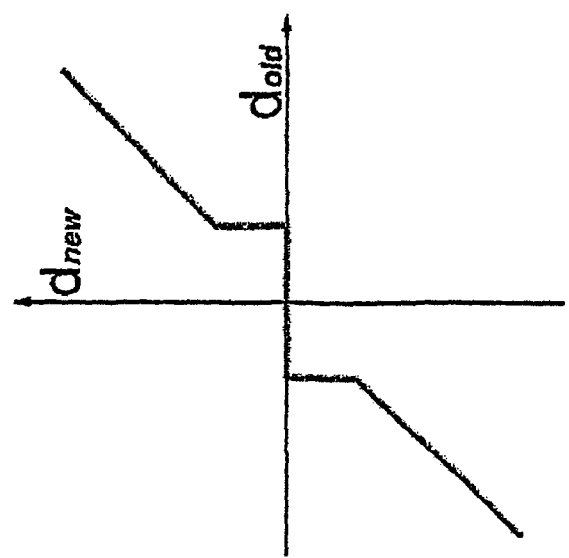
FIG. 14 is a graph showing the result of noise reduction with jump discontinuity.

Normally, noise reduction in sharpening algorithms is achieved via a threshold value. If the absolute value of the luminosity difference $d_c$ (where c is a color channel) does not exceed a threshold value, then $d_c$ is set to zero. This results in not sharpening pixels with a low luminosity difference value, while sharpening all other pixels normally. As shown in FIG. 14, this results in a jump discontinuity in luminosity difference values, which leads to images that look unnatural.

Figure 16:
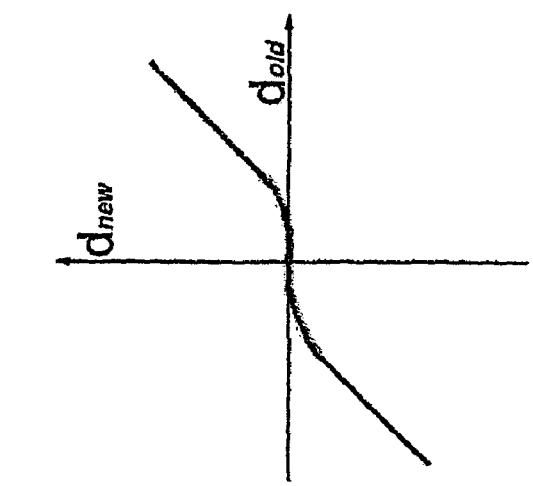
FIG. 16 is a graph showing the result of noise reduction eliminating jump discontinuity according to another embodiment of the present invention.
Figure 15:
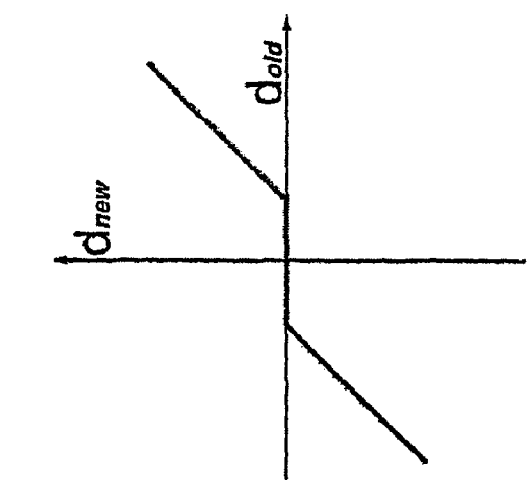
FIG. 15 is a graph showing the result of noise reduction eliminating jump discontinuity according to the present invention.

In one preferred embodiment, adjustment step 142 comprises a noise reduction algorithm 162 to prevent jump discontinuities. In one preferred embodiment of a noise reduction algorithm 162, a different curve that does not have the jump discontinuity is used. A preferred embodiment is to set the values of $d_r$, $d_g$ and $d_b$ to zero when they do not exceed the threshold value, but so alter the curve in a way that there is no jump, as shown in FIG. 15. By doing so, the image looks much more natural while reducing the sharpening of noise pixels. Other embodiments of a sharpening threshold are possible, such as a polynominal (or trigonometrical or any other multiple times derivable) curve that has no such sharp bend, such as shown in FIG. 16. This leads to even more natural looking images.

Correlation Process

With reference to FIG. 1, in its general embodiment correlation process 10 comprises the steps of:

(1) selecting 94 one or more than one image parameter for a digital image 38;

(2) selecting 96 one or more than one print parameter;

(3) selecting 98 one or more than one viewing parameter for a digital image 38;

(4) selecting 100 a sharpening radius 12 as the initial sharpening radius;

(5) sharpening 102 a copy of digital image 38 using a sharpening algorithm 140 of choice, yielding a test print 104;

(6) altering 106 the sharpening radius;

(7) sharpening 108 a copy of digital image 38 using a sharpening algorithm 140 of choice, yielding a test print 110;

(8) comparing 112 all test prints at the chosen one or more than one viewing parameter 98 by one or more than one judge (not shown);

(9) repeating 114 altering step 106, sharpening step 108 and comparing step 112 until an optimal print is found;

(10) recording 116 the sharpening radius used for the optimal print;

(11) determining 118 whether a new viewing parameter is to be chosen, and if so, repeating selecting step 98 through recording step 116;

(12) determining 120 whether a new print parameter is to be chosen, and if so, repeating selecting step 96 through determining step 118; and

(13) determining 122 whether a new image parameter is to be chosen, and if so, repeating selecting step 94 through determining step 120, and if not, ending 124 the process;

where all desired image parameters, print parameters, and viewing parameters are now correlated with a sharpening radius 12.

Any value for the sharpening radius 12 may be used as the initial value, but values which convert to between 1 to 2 pixels are preferred. Altering step 106 may be by incrementing or decrementing the sharpening radius.

Preferably, the sharpening strength and sharpening threshold value, if required by the sharpening algorithm 140, should be held constant during correlation process 10. In one preferred embodiment, sharpening strength may be set to between 120% and 140%, and preferably 130%. Sharpening threshold preferably may be turned off, or set to the lowest possible value. As will be evident to those skilled in the art with reference to this disclosure, other values for sharpening threshold and sharpening strength may be used, or even repeated at multiple values. It is likely, however, that such additional testing would yield only incremental benefits.

In one further embodiment of correlation process 10, viewing parameters are held constant, and no changes in viewing parameters are made in determining step 118. As will be evident to those skilled in the art with reference to this disclosure, any combination of changing/holding constant the parameters is possible with correlation process 10.

Preferred Embodiment of Correlation Process

The optimal sharpening radius 12 for a theoretical digital image with infinite image resolution 44 is the radius which leads to the largest possible sharpening halos in the image which cannot be seen in the print. In other words, if you have a printer with a printer resolution 46 expressed in measurement units of 0.02 mm (i.e., the smallest details of an image that will be visible in the print have the size of 0.02 mm on the paper) then a halo radius of 0.019 mm is optimal. If the sharpening radius 12 exceeds this 0.02 mm the viewer will see the halos and possibly determine the print 104, 110 as "ugly." If the halos are much smaller than 0.02 mm, the print is not sharpened optimally.

It is not only the printer resolution 46 that matters. This means the smallest detail that can be seen in a printed image is not only dependent on the printer quality, but also on the physical capabilities of the human eye and various other factors. In other words, if you have a printer with extraordinary high resolution, say 0.0001 mm resolution, you'd still have to sharpen with a sharpening radius 12 of more than this, since otherwise the effect would not be visible.

Figures 2, 3:
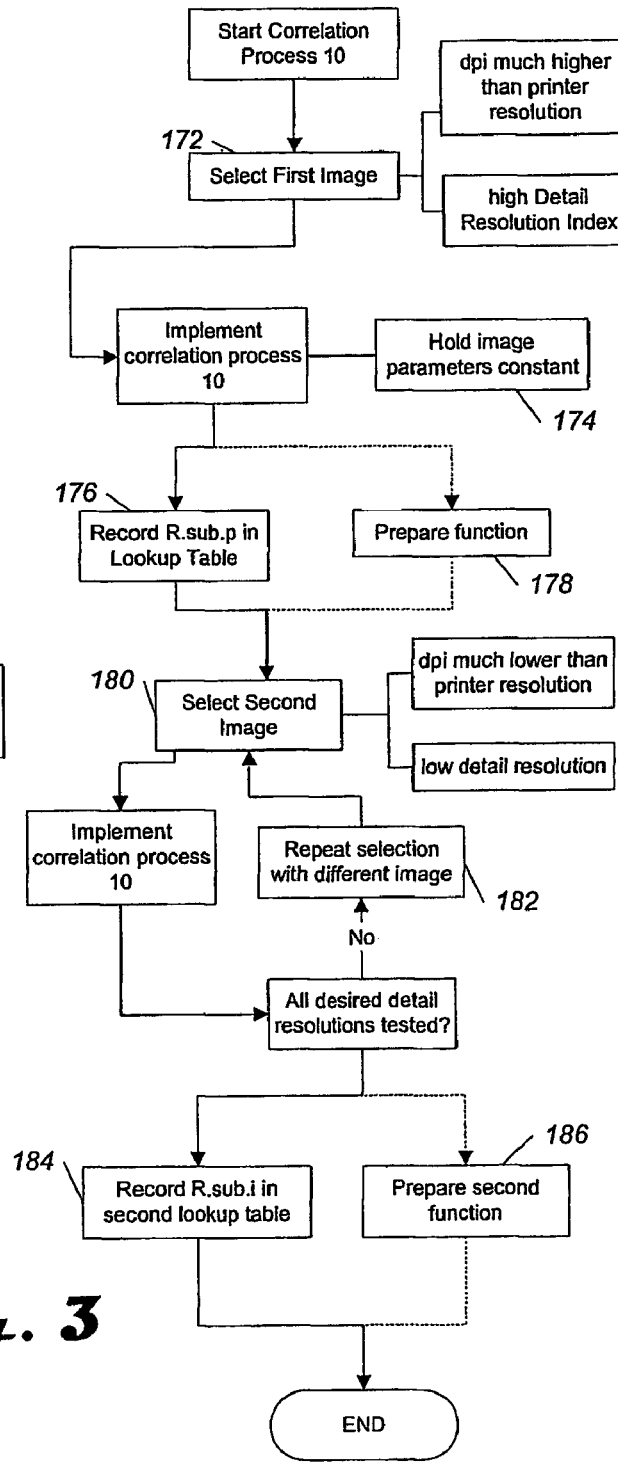
FIG. 2 is a flow diagram of the process of FIG. 1 according to one preferred embodiment of the present invention.
FIG. 3 is a flow diagram of the process of FIG. 1 according to another preferred embodiment of the present invention.

With reference to FIG. 2, a further embodiment of correlation process 10 further comprises the steps of:

(1) selecting 168 a digital image 38 having image resolution 44 much higher than printer resolution 46, a very high image quality 64, and very good image source 52; and (2) holding 170 image parameter 16 and viewing parameter 18 constant.

This embodiment proceeds on the assumption that digital image 38 has an effective infinite image resolution 44 and infinite detail resolution 66. To a good approximation, a commercially acceptable digital image 38 having pixel dimension 86 and print dimension 40 such that the image resolution 44 is higher than whatever the printer needs 128, as an approximation to the theoretical infinite optical resolution and infinite physical resolution print, and which has satisfies conditions of high image quality 64 and very good image source 52 meets this condition. For example, if 300 dpi to 350 dpi is considered sufficient image resolution 44 for a 180 lpi print, it is by far sufficient to have an image with 700 dpi image resolution 44. One preferred method is to take a stock photography art image and reduce its printing size so that it has 700 dpi image resolution 44.

Preferably, at least 5 different printer resolution 46 settings should be determined for each printer 24, 26, or 28, chosen within printer type 42. It is possible to interpolate the missing values polynomially or linearly, but as will be known to those skilled in the art with reference to this disclosure, the more measured values the better the determination of the relationship. Practice has shown that the assumption that values can be interpolated linearly, should not be made, as it is not always true.

Sharpening method 36 may now be implemented with this correlation, and a satisfactory sharpening method based upon print parameters will be available as described.

With reference to FIG. 3, a preferred embodiment of correlation process 10 further comprises the steps of:

(1) selecting 172 a first digital image 38 having image resolution 44 much higher than printer resolution 46, and a high detail resolution index 68;

(2) holding 174 image parameter 16 constant;

(3) recording 176 a correlated printer based sharpening radius 188;

(4) selecting 180 a second digital image 38 having image resolution 44 much lower than printer resolution 46;

(5) repeating 182 selecting step 180 with a different digital image 38 until all desired detail resolution 66 have been tested; and (6) recording 184 a correlated image based sharpening radius 190.

This embodiment results in two sets of sharpening radius: one correlating print and viewing parameters with a printer based sharpening radius 188, and a second correlating detail resolution with an image based sharpening radius 190. Optionally, in a further preferred embodiment the recording step 176 further comprises recording the printer based sharpening radius 188 in a lookup table 192, and recording step 184 further comprises recording the image based sharpening radius 190 in a second lookup table 194. As will be described below, these two lookup tables will be useable in sharpening method 36.

It is preferable in selecting step 180 through recording step 184 in this embodiment to use a printer with printer resolution 46 much higher than the image resolution 44 of digital image 38. This can be gained very easily by printing the digital image 38 at a very low image resolution 44, such as 35 dpi, or even by looking at the digital image 38 on computer monitor 32 at 72 dpi. In the later case no actual prints 104 or 110 need be made to use correlation process 10. One preferred embodiment is to take as many different digital image 38 as possible and calculate their detail resolution index 68 using detail identification process 70. Optionally, values for detail resolution index 68 may be classified into sections (such as 0 thorough 20, 21 through 40 and so forth) and correlation made for each of these sections.

In a still further embodiment, recording step 176 further comprises preparing 178 a mathematical function yielding printer based sharpening radius 188, and recording step 184 further comprises preparing 186 a second function yielding the image based sharpening radius 190. The second function could be a polynomial to fit to all found radius values, yielding a function with detail resolution index 68 as its input and the desired sharpening radius 12 as its output. In some cases, the function will be linear.

In further embodiments, further correlations will have been drawn with paper type, color vs. black & white ink, and paper manufacturer. For any given combination of printer type and printer resolution, or of further parameters in the other embodiments, it is now possible to predict which sharpening radius will yield a preferred level of sharpening.

In a further embodiment, a third lookup table may be created correlating sharpening radius 12 with one or more than one image viewing parameter 18. The three lookup tables, one correlated to print parameter 14, one correlated with viewing parameter 18, and one correlated with image parameter 16 could be used in combination in sharpening method 36.

It may be possible to rely on interpolation techniques that will be well known to those skilled in the art with reference to this disclosure. For example, if lookup table 192 correlates radius with viewing and print parameters, and includes a determined sharpening radius 12 for a given inkjet printer 26 for 9 resolutions at reading distance, but only 2 resolutions at a second distance, it is likely that an interpolation will give a workable value for the other 7 resolutions at that second distance. Personal taste parameters, if correlated in either the first lookup table 192, or other lookup tables, are also likely to lend to interpolation. On the other hand, printing quality 48 is likely not to be readily estimated by interpolation or extrapolation.

If a plurality of lookup tables has been constructed according the preferred embodiment, or other embodiments, it is necessary to combine the tables. This is done at the time of sharpening, within sharpening method 36.

It will be evident to those skilled in the art with reference to this disclosure that various combinations of printer, printer resolution, viewing distance and personal taste, or other parameters such as paper type, color vs, black & white ink, and paper manufacturer may also be correlated in like fashion.

Sharpening Method

With reference to FIG. 6, sharpening method 36 comprises the steps of:

(1) receiving 196 one or more than one print parameter 14, one or more than one image parameter 16, and optionally one or more than one viewing parameter 18;

(2) determining 200 the sharpening radius 12 from the received parameters; and (3) applying 202 a sharpening algorithm 140.

In one embodiment, determining step 200 comprises the step of retrieving the sharpening radius from lookup table 192 prepared using correlation process 10.

Figure 6A:
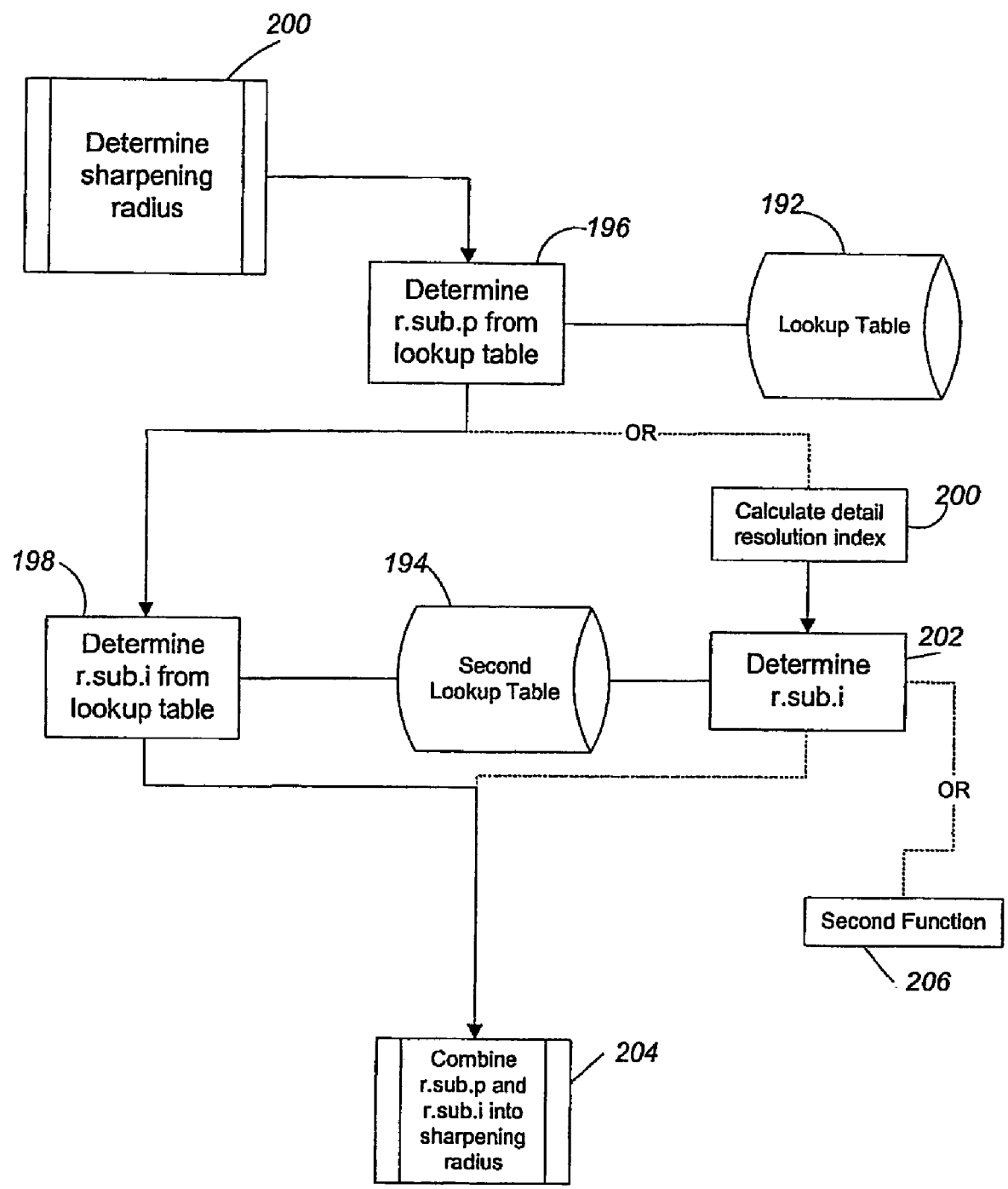
FIG. 6A is a flow diagram of the step from FIG. 6 for determining the sharpening radius.

In a preferred embodiment, with reference to FIG. 6A, determining step 200 comprises the steps of:

(1) determining 196 a printer based sharpening radius 188 from the received parameters;

(2) determining 198 an image based sharpening radius 190 from the received parameters; and (3) combining 204 the printer based sharpening radius 188 and the image based sharpening radius 190 into a sharpening radius 12.

In one embodiment, the determining step 196 comprises retrieving the radius data from a lookup table 192 prepared using correlation process 10, and the determining step 198 comprises retrieving the radius data from a second lookup table 194 prepared using correlation process 10. In a preferred embodiment, the determining step 198 comprises the steps of calculating 200 the detail resolution of the digital image, preferably using a detail identification process such as detail identification process 70, and either retrieving the radius data from a second lookup table 194 prepared using correlation process 10, or by using the second function 206 prepared in step 186 of correlation process 10.

As will be evident to those skilled in the art with reference to this disclosure, it is possible to receive information in a variety of ways. For example, the user may input the information, either through response to questions, or by using dialog boxes, or by manipulating visual sliders within drop down boxes. Additionally, optionally the program may directly query the computer to determine the parameters, without operator intervention.

In one embodiment, only one lookup table will be used, and the sharpening radius correlated to the received print parameter will be found. This sharpening radius will be used with sharpening algorithm 140, comprising optionally one or more than one of hue protection algorithm 158, antialiasing protection 160, noise reduction 162, and foliage protection 152, to produce a sharpened image.

In the embodiment shown in FIG. 6A, two lookup tables are created, one correlating one or more than one print parameter 14 and one or more than one viewing parameter 18 with a printer based sharpening radius 188 $r_p$, and the second lookup table 194, or optionally function 206, with an image based sharpening radius 190 $r_i$. From the received parameters it is necessary to lookup, or calculate the values for both $r_p$ and $r_i$ which have been stored in measurement units of millimeters or inches, as described above, and some method must be used to combine 204 the two values to one unified sharpening radius 12 r. It is a matter of personal taste how to do that; any plausible merging of these values will do, so long as $r_p$ and $r_i$ are merged to one unified radius r. Various methods will be evident to those skilled in the art, such as taking the maximum of the values:

$$r = \max(r_i, r_p) \quad \text{(Eq. 41)}$$

or, the arithmetic mean of the values:

$$r = (r_i + r_p)/2 \quad \text{(Eq. 42)}$$

or, the geometric mean of the values:

$$r = (r_i * r_p)^{0.5} \quad \text{(Eq. 43)}$$

or, the harmonic mean of the values:

$$r = 2 * r_i * r_p / (r_i + r_p) \quad \text{(Eq. 44)}$$

or, even weighted combinations of these or similar calculations. In general, any plausible interpolation or merging of the values $r_i$ and $r_p$ will work, and provide a better result than using either alone.

The merged radius r, which is now inch- or millimeter-based, is now converted into a radius $r_{pix}$ which is pixel based, as described above. Sharpening algorithm 140 is now performed 202, using radius $r_{pix}$ as the sharpening radius 12. Any embodiment of sharpening algorithm 140 may be used, including described processes for adjustment for foliage protection 152, hue protection 158, antialiasing 160, and noise reduction 162.

Optionally, sharpening strength p may be varied for different personal tastes, i.e., when the user prefers rather soft sharpening, choose a lower strength p, if the user prefers aggressive sharpening, choose a high value for p. This may be used as a method to account for personal taste, instead of the use of judges, as described above.

In practice, not much benefit is gained by adjusting sharpening strength p to the printer resolution, the viewing distance, etc., so it is preferable not to include different sharpening strengths when creating the $r_p$ and $r_i$ tables. Therefore you have to alter the sharpening strength p only slightly for various personal tastes, if at all.

Sharpening System

Having now completed correlation process 10, chosen a sharpening algorithm 140 and a sharpening method 36, it is necessary to assemble the components to into a sharpening system 20.

Preferably, sharpening method 36 will be embodied in a computer program (not shown) either by coding in a high level language, or by preparing a filter which is complied and available as an adjunct to an image processing program. For example, in a preferred embodiment, sharpening method 36 is compiled into a plug-in filter that can operate within third party image processing programs such as PHOTOSHOP®.

Any currently existing or future developed computer readable medium suitable for storing data can be used to store the programs embodying the afore-described methods and algorithms, including, but not limited to hard drives, floppy disks, digital tape, flash cards, compact discs, and DVDs. The computer readable medium can comprise more than one device, such as two linked hard drives. This invention is not limited to the particular hardware used herein, and any hardware presently existing or developed in the future that permits image processing can be used.

In a preferred embodiment, sharpening system 20 comprises a computer monitor 32 and computer CPU 34 comprising a memory (not shown) and program instructions (not shown) for executing sharpening method 36 on a digital image 38, for output on one or more than one printer type 42, or a digital display device 30 through the Internet. As will be evident to those skilled in the art with reference to this disclosure, various combinations of printer type 42 or digital display device 30 will be possible using sharpening system 20.

In one embodiment, it is possible to have the program instructions query the components of the system, including but not limited to any image processing program being used, and printer being used, to determine the default settings for such programs and devices, and use those parameters as the inputs into the sharpening method. For example, a digital image 38 to be sharpened using an image processing program may be set, internally to that program and hardware, to a particular print dimension, and having a given pixel dimension and image resolution, for printing on a default printer of a particular printer type, having defaults set to a particular paper type, and printing quality, etc. These parameters may automatically be determined without operator intervention, and set as the defaults for the sharpening system. In a further embodiment, determination of detail resolution 66 may also be automated by an autoscan initiating detail identification process 70 and determining a detail resolution index 68 upon program initialization. Depending upon the particular needs, these defaults may be further changeable by operator intervention, or not. Thus it is to be understood that in this disclosure a reference to receiving parameters includes such automated receiving means and is not to be limited to receiving by operator input. The receiving of parameters will therefore be accomplished by a module, which may be a combination of software and hardware, to receive the one or more than one image parameter and the one or more than one print parameter, and optionally one or more viewing parameters, either by operator input, by way of example through a digital display device 32 interface, by automatic determination of defaults as described, or by a combination.

The received parameters are then used to determine the image sharpening radius to be used to produce a sharpened image, by use of the methods described herein or their equivalents, which is also to be implemented in a module, either software, hardware, or combination.

The image sharpening radius is then to be used by implementation of one or more of the sharpening algorithms described herein or their equivalents, to sharpen the digital image, which is also to be implemented in a module, either software, hardware, or combination.

The sharpened digital image is then stored in a memory block in a data storage device within computer CPU 34 and may be printed on one or more printers, transmitted over the Internet, or stored for later printing.

In the foregoing specification, the invention has been described with reference to specific embodiments thereof. It will, however, be evident that various modifications and changes may be made thereto without departing from the broader spirit and scope of the invention. The specification and drawing are, accordingly, to be regarded in an illustrative rather than a restrictive sense. It should be appreciated that the present invention should not be construed as limited by such embodiments, but rather construed according to the below claims.

The invention claimed is:

1. A system for sharpening a digital image having one or more than one image parameter, for printing with one or more than one print parameter, and for viewing at one or more than one viewing parameter, comprising:
a first data storage device for storing radius information correlating one or more than one sharpening radius with one or more than one print parameter;
a receiving module to receive the one or more than one print parameter for printing the digital image;
a determining module to determine an image sharpening radius for the digital image from the radius information and the received one or more than one print parameter;
a sharpening module for implementing a sharpening algorithm to produce a sharpened digital image using the image sharpening radius; and
a second darn storage device for storing the sharpened digital image.

2. The system of claim 1, wherein the one or more than one sharpening radius is further correlated with one or more than one image parameter, or one or more than one viewing parameter, or both.

3. A system for sharpening a digital image having one or more than one image parameter, for printing with one or more than one print parameter, and for viewing at one or more than one viewing parameter, comprising:
a first data storage device for storing sharpening radius information correlated in a correlation process with one or more than one print parameter;
a receiving module to receive the one or more than one print parameter for printing the digital image;
a determining module to determine an image sharpening radius for the digital image from the sharpening radius information and the received one or more than one print parameter;
a sharpening module for Implementing a sharpening algorithm to produce a sharpened digital image using the image sharpening radius; and
a second data storage device for storing the sharpened digital image.

4. The system of claim 3, wherein the sharpening radius information is further correlated with one or more than one image parameter, or one or more than one viewing parameter, or both.

5. The system of claim 3, wherein the correlation process comprises the steps of:
selecting an initial sharpening radius as a test radius;
repeating until an optimal print is found, the steps of:
sharpening a copy of the digital image using the test radius algorithm; printing a test print altering the test radius; and comparing all test prints;
recording the test radius used to print the optimal print; and
storing the test radius used to print the optimal print in the first data storage device.

6. The system of claim 3, the digital image comprising pixels with luminosity, wherein the sharpening algorithm comprises the steps of:
blurring a copy of the digital image using the image sharpening radius to produce a blurred image, the blurred image comprising pixels with luminosity;
calculating a luminosity difference between the luminosity of the pixels of the digital image and the luminosity of the pixels of the blurred image;
adjusting the luminosity difference by applying one or more than one algorithm chosen from the group consisting of a hue protection algorithm, an antialiasing protection algorithm, a noise reduction algorithm, and an over-sharpening protection algorithm; and
combining the digital image with the luminosity difference to produce a sharpened image.

7. A method for sharpening a digital image having one or more than one image parameter, for printing with one or more than one print parameter, and for viewing at one or more than one viewing parameter, comprising the steps of:
receiving the one or more than one print parameter for printing the digital image;
interrogating a first data storage device storing sharpening radius information correlated in a correlation process with one or more than one print parameter;
determining an image sharpening radius for the digital image from the sharpening radius information and the received one or more than one print parameter;
sharpening the digital image using the image sharpening radius in a sharpening algorithm to produce a sharpened digital image; and
storing the sharpened digital image in a second data storage device.

8. The method of claim 7, wherein the sharpening radius information is further correlated with one or more than one image parameter, or one or more than one viewing parameter, or both.

9. The method of claim 8, wherein the correlation process comprises the steps of:
selecting an initial sharpening radius as a test radius;
repeating until an optimal print is found, the steps of:
sharpening a copy of the digital image using the test radius in a sharpening algorithm; printing a test print; altering the test radius; and comparing all test prints;
recording the test radius used to print the optimal print; and
storing the test radius used to print the optimal print in the first data storage device.

10. The method of claim 7, the digital image comprising pixels with luminosity, wherein the sharpening algorithm comprises the steps of:
blurring a copy of the digital image using the image sharpening radius to produce a blurred image, the blurred image comprising pixels with luminosity;
calculating a luminosity difference between the luminosity of the pixels of the digital image and the luminosity of the pixels of the blurred image;
adjusting the luminosity difference by applying one or more than one algorithm chosen from the group consisting of a hue protection algorithm, an antialiasing protection algorithm, El noise reduction algorithm, and an over-sharpening protection algorithm; and
combining the digital image with the luminosity difference to produce a sharpened image.

11. A computer readable medium having contents for causing a computer-based information handling system to perform steps for sharpening a digital image having one or more than one image parameter, for printing with one or more than one print parameter, and for viewing at one or more than one viewing parameter, the steps comprising:
  receiving the one or more than one print parameter for printing the digital image;
  interrogating a first data storage device storing sharpening radius information correlated in a correlation process with one or more than one print parameter;
  determining an image sharpening radius for the digital image from the radius information and the received one or more than one print parameter;
  sharpening the digital image using the image sharpening radius in a sharpening algorithm to produce a sharpened digital image; and
  storing the sharpened digital image in a second data storage device.

12. The computer readable medium of claim 11, wherein the sharpening radius information is further correlated with one or more than one image parameter, or one or more than one viewing parameter, or both.

13. The computer readable medium of claim 12, wherein the correlation process comprises the steps of:
  selecting an initial sharpening radius as a test radius;
  repeating until an optimal print is found, the steps of:
    sharpening a copy of the digital image using the test radius in a sharpening algorithm; printing a test print; altering the test radius; and comparing all test prints;
  recording the test radius used to print the optimal print; and
  storing the test radius used to print the optimal print in the first data storage device.

14. The computer readable medium of claim 11, the digital image comprising pixels with luminosity, wherein the sharpening algorithm comprises the steps of:
  blurring a copy of the digital image using the image sharpening radius to produce a blurred image, the blurred image comprising pixels with luminosity;
  calculating a luminosity difference between the luminosity of the pixels of the digital image and the luminosity of the pixels of the blurred image;
  adjusting the luminosity difference by applying one or more than one algorithm chose it from the group consisting of a hue protection algorithm, an antialiasing protection algorithm, a noise reduction algorithm, and an over-sharpening protection algorithm; and
  combining the digital image with the luminosity difference to produce a sharpened image.

15. A method for sharpening a digital image, the digital image comprising pixels with luminosity, comprising the steps of:
  blurring a copy of the digital image to produce a blurred image, the blurred image comprising pixels with luminosity;
  calculating a luminosity difference between the luminosity of the pixels of the digital image and the luminosity of the pixels of the blurred image; and
  combining the digital image with the luminosity difference to produce a sharpened image, using an over-sharpening protection algorithm.

16. The method of claim 15, further comprising the step of adjusting the luminosity difference by applying one or more than one algorithm chosen from the group consisting of a hue protection algorithm, an antialiasing protection algorithm, and a noise reduction algorithm.

17. A method for sharpening a digital image, the digital image comprising pixels with luminosity, comprising the steps of:
  blurring a copy of the digital image to produce a blurred image, the blurred image comprising pixels with luminosity;
  calculating a luminosity difference between the luminosity of the pixels of the digital image and the luminosity of the pixels of the blurred image;
  adjusting the luminosity difference by applying one or more than one algorithm chosen from the group consisting of a hue protection algorithm, an antialiasing protection algorithm, a noise reduction algorithm, and an over-sharpening protection algorithm; and
  combining the digital image with the luminosity difference to produce a sharpened image.

18. The method of claim 17, the step of combining the digital image with the luminosity difference comprising an over-sharpening protection algorithm.

19. A method for determining a detail resolution of a digital image comprising pixels with luminosity, for use in a sharpening algorithm, comprising the steps of:
  choosing a plurality of related pixel pairs in the digital image;
  calculating a pixel luminosity difference for each of the plurality of pixel pairs;
  determining the largest pixel luminosity difference; and
  setting the detail resolution for the digital image equal to the largest luminosity difference.

20. The method of claim 19, further comprising the step of eliminating one or more than one of the largest pixel luminosity differences.

21. A process for correlating a sharpening radius with one or more than one image parameter, one or more than one print parameter, or one or more than one viewing parameter, for use in sharpening a digital image having one or more than one image parameter, for printing with one or more than one print parameter, and for viewing at one or more than one viewing parameter, comprising the steps of:
  choosing the one or more than one image parameter, the one or more than one print parameter, or the one or more than one viewing parameter to be correlated;
  selecting an initial sharpening radius as a test radius;
  repeating until an optimal print is found, the steps of:
    sharpening a copy of the digital image using the test radius in a sharpening algorithm; printing a test print; altering the test radius; and comparing all test prints;
  recording the test radius used to print the optimal print; and
  setting the sharpening radius to the test radius used to print the optimal print.

* * * * *